United States Patent
Daniel

(10) Patent No.: US 10,104,075 B2
(45) Date of Patent: Oct. 16, 2018

(54) IMAGE FORMING SYSTEM FOR AUTHORIZING THE USE OF A MULTIFUNCTION PERIPHERAL

(71) Applicant: KYOCERA Document Solutions Inc., Osaka-shi, Osaka (JP)

(72) Inventor: R J Lee Daniel, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 15/911,203

(22) Filed: Mar. 5, 2018

(65) Prior Publication Data

US 2018/0262492 A1 Sep. 13, 2018

(30) Foreign Application Priority Data

Mar. 13, 2017 (JP) .................................. 2017-047798

(51) Int. Cl.
*H04L 29/06* (2006.01)
*G06F 3/12* (2006.01)
(Continued)

(52) U.S. Cl.
CPC ........ *H04L 63/0861* (2013.01); *G06F 3/1222* (2013.01); *G06F 3/1238* (2013.01);
(Continued)

(58) Field of Classification Search
None
See application file for complete search history.

(56) References Cited

U.S. PATENT DOCUMENTS 10,009,486 B2 * 6/2018 Ohara ...................... G06F 21/31
2006/0061803 A1 * 3/2006 Oka ....................... G06F 21/445
358/1.15

(Continued)

FOREIGN PATENT DOCUMENTS

JP 2016062189 A 4/2016
WO 2009011436 A1 1/2009

*Primary Examiner* — Miya J Williams
(74) *Attorney, Agent, or Firm* — Viering, Jentschura & Partner mbB

(57) ABSTRACT

This image forming system includes an information processing device, a server, and a multifunction peripheral. The server stores in advance fingerprint information of authorized users of information processing devices. When the stored fingerprint information matches a user's fingerprint information from the information processing device, the server transmits user's identification information and an access token to the information processing device and multifunction peripheral. Upon accepting the first request to log in to the multifunction peripheral, the information processing device transmits identification information and access token stored in the information processing device to the multifunction peripheral. When the identification information and access token from the information processing device match the identification information and access token stored in the multifunction peripheral, the multifunction peripheral authorizes the user of the information processing device that transmitted the identification information and access token to use the multifunction peripheral.

6 Claims, 20 Drawing Sheets

(51) Int. Cl.
*H04N 1/00* (2006.01)
*H04W 12/06* (2009.01)

(52) U.S. Cl.
CPC .......... *G06F 3/1288* (2013.01); *G06F 3/1292* (2013.01); *H04L 63/083* (2013.01); *H04L 63/102* (2013.01); *H04N 1/00103* (2013.01); *H04N 1/00933* (2013.01); *H04W 12/06* (2013.01); *H04L 2463/082* (2013.01); *H04N 2201/0094* (2013.01)

(56) References Cited

U.S. PATENT DOCUMENTS

| | | | | |
|---|---|---|---|---|
| 2013/0047247 A1* | 2/2013 | Matsuda | ............... | G06F 21/335 726/9 |
| 2015/0154484 A1* | 6/2015 | Iwasaki | ............. | G06K 15/4095 358/1.14 |
| 2015/0304295 A1* | 10/2015 | Chiba | .................... | G06F 21/335 726/4 |
| 2016/0080383 A1* | 3/2016 | Hockings | ............ | H04L 63/0846 726/9 |
| 2017/0048233 A1* | 2/2017 | Khylkouskaya | .... | H04L 63/0807 |
| 2017/0257441 A1* | 9/2017 | Ohara | ................. | H04L 61/2038 |
| 2017/0257516 A1* | 9/2017 | Panda | ................. | H04N 1/32133 |
| 2018/0107531 A1* | 4/2018 | Lee | ......................... | G06F 9/546 |

* cited by examiner

IMAGE FORMING SYSTEM FOR AUTHORIZING THE USE OF A MULTIFUNCTION PERIPHERAL

CROSS REFERENCE TO RELATED APPLICATION

This application claims priority to Japanese Patent Application No. 2017-47798, which was filed on Mar. 13, 2017, and is incorporated herein by reference in its entirety.

BACKGROUND

This disclosure relates to image forming systems, and more particularly, to an image forming system including a multifunction peripheral, an information processing device, and a server connected through a network, and having the technology to authorize the use of the multifunction peripheral.

There have been techniques proposed for controlling a multifunction peripheral to perform print processing in response to an instruction issued by an information processing device, such as a mobile information terminal, on a network of an image forming system. In such an image forming system, a server, or an authentication server, is connected to the network, and the server authenticates and authorizes the user of the information processing device to use the multifunction peripheral. For example, a conventionally well-known technique includes a sub-terminal device that performs identity authentication of a user using the user's biological information and is connected to a server through a network. The server acquires authentication result information, which represents the result of the identity authentication, from the sub-terminal device, and transmits the authentication result information to a main terminal device over the network. Then, the main terminal device performs appropriate processing in accordance with the authentication result information.

In another conventional technique, for example, a server transmits an authentication code to a wireless mobile terminal, while adding information about a validated period to the authentication code. When a user manipulates an authenticated terminal to transmit the authentication code and the server receives the authentication code from the authenticated terminal, the server verifies the authentication code and the validated period. If the authentication code matches the code in the server and the period has not expired yet, the server authorizes the user to use a service device.

SUMMARY

The image forming system in an aspect of the present disclosure includes an information processing device, a server, and a multifunction peripheral that are connected on a network. The information processing device includes a first storage unit, an operation accepting section, a first communication unit, a biological information acquiring unit, a biological information transmission instructing section, an authentication information receiving section, and an authentication information transmitting section. The server includes a second storage unit, a second communication unit, a determination section, a token generator, and an authentication information instructing section. The image processing apparatus includes a third storage unit, a third communication unit, an authentication information acquiring section, a first determination section, and a controller.

The operation accepting section of the information processing device accepts an operational instruction from a user who is an operator of the information processing device. The first communication unit performs data communication with the server and the multifunction peripheral through the network. The biological information acquiring section acquires user-designated biological information from the user. When the operation accepting unit accepts a request to start operating the multifunction peripheral, the biological information transmission instructing section transmits the biological information, which is acquired by the biological information acquiring section, from the first communication unit to the server through the network. When the first communication unit receives from the server through the network user's identification information for identifying the user and an access token to be used to log in to the multifunction peripheral to authorize the user to use the multifunction peripheral, the authentication information receiving section stores received the identification information and access token in the first storage unit. When the operation accepting section accepts the first request to log in to the multifunction peripheral after the authentication information receiving section receives the identification information and the access token, the authentication information transmitting section transmits the identification information and access token stored in the first storage unit from the first communication unit to the multifunction peripheral through the network.

The second storage unit of the server stores in advance the biological information of individual users who are authorized to use the multifunction peripheral, and the identification information of the users associated with the biological information. The second communication unit performs data communication with the information processing device and the multifunction peripheral through the network. When the second communication unit receives the biological information from the information processing device through the network, the determination section determines whether the biological information received by the second communication unit matches the biological information stored in the second storage unit. When the determination section determines that the biological information received by the second communication unit matches the biological information stored in the second storage unit, the token generator generates the access token. When the token generator generates the access token, the authentication information instructing section acquires the identification information of the user, whose biological information is determined by the determination section to match the biological information in the second storage unit, from the second storage unit, and transmits acquired the identification information and the access token generated by the token generator from the second communication unit to the information processing device and the multifunction peripheral through the network. The third communication unit of the multifunction peripheral performs data communication with the information processing device and the server through the network. When the third communication unit receives the identification information and the access token from the server through the network, the authentication information acquiring section stores received the identification information and access token in the third storage unit. When the third communication unit receives the identification information and the access token from the information processing device through the network, the first determination section determines whether the identification information received by the third communication unit matches the identification information stored in the third storage unit, and also determines whether the access token received by the third communication unit matches the access token stored in the third storage unit. When the first determination section determines that the identification information received by the third communication unit matches the identification information stored in the third storage unit and determines that the access token received by the third communication unit matches the access token stored in the third storage unit, the controller authorizes the user to use the multifunction peripheral.

DETAILED DESCRIPTION

Figure 1:
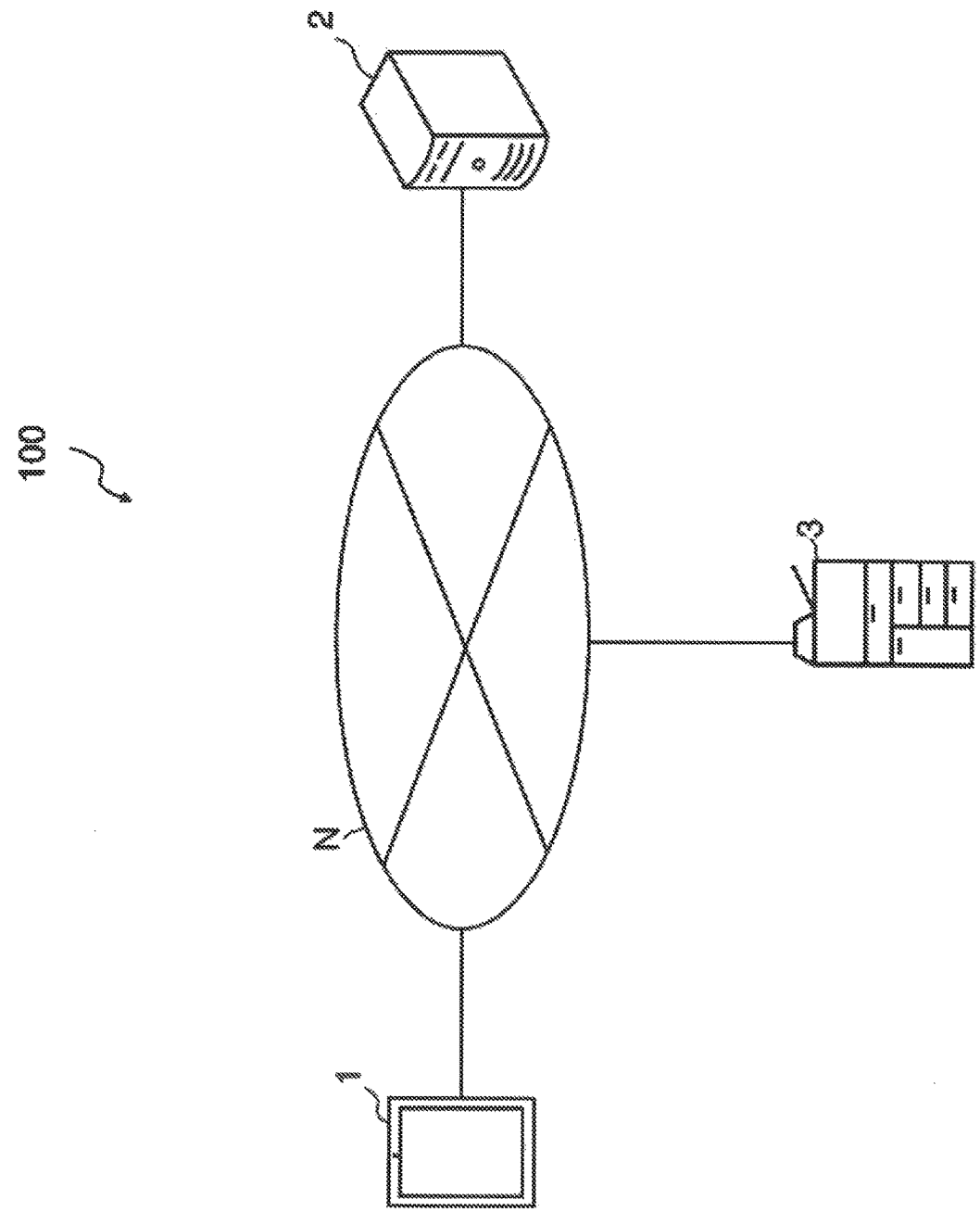
FIG. 1 depicts the entire image forming system according to an embodiment of the disclosure.

With reference to the accompanying drawings, an image forming system according to an embodiment of the present disclosure will be described below. FIG. 1 depicts the entire image forming system according to the embodiment of the disclosure.

The image forming system 100 includes an information processing device 1, a server 2, and a multifunction peripheral 3. The information processing device 1, server 2, and multifunction peripheral 3 transmit and receive authentication information, such as identification information, print job data, and other various types of data from one another through a network N, for example, an intranet or the Internet. In the image forming system 100, the server 2 manages authentication for a user who is an operator of the information processing device 1 to use the multifunction peripheral 3, which will be described later in detail. If there is more than one information processing device 1 and multifunction peripheral 3 connected to the network N in the image forming system 100, the server 2 manages all the information processing devices 1 (and their users) and multifunction peripherales 3. The following description illustrates a print process performed by the multifunction peripheral 3 as an example use of the multifunction peripheral 3.

Figure 2:
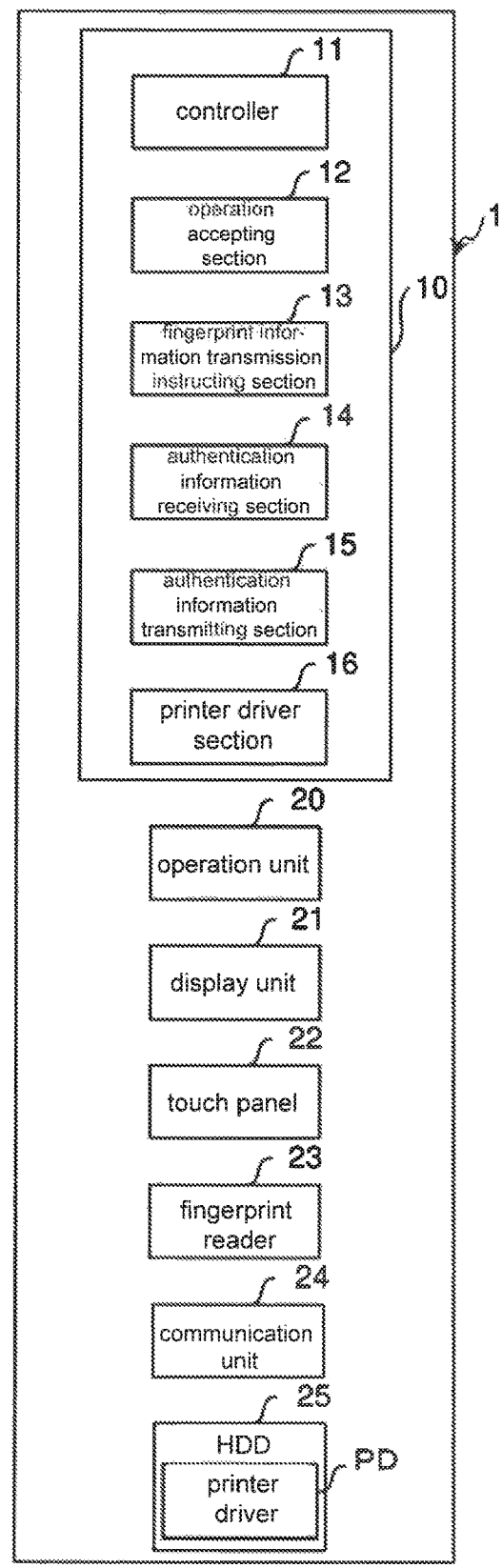
FIG. 2 is a functional block diagram showing main elements of an image processing device.

Referring to FIG. 2, a detailed description of the information processing device 1 will be given. FIG. 2 is a functional block diagram showing main elements of the image processing device.

The information processing device 1 is, for example, a mobile information terminal, such as a smartphone and a tablet PC, or a personal computer. The information processing device 1 includes a control unit 10, an operation unit 20, a display unit 21, a touch panel 22, a fingerprint reader 23, a communication unit 24, and a HDD 25. These components are configured to be capable of receiving and transmitting data or signals through a CPU bus. The control unit 10 is composed of a processor, a random access memory (RAM), a read only memory (ROM), and some other components. The processor is, for example, a central processing unit (CPU), MPU, or ASIC. Running a print request program stored in the HDD 25 or other storages on the processor allows the control unit 10 to function as a controller 11, an operation accepting section 12, a fingerprint information transmission instructing section 13, an authentication information receiving section 14, and an authentication information transmitting section 15. However, the controller 11, operation accepting section 12, fingerprint information transmission instructing section 13, authentication information receiving section 14, and authentication information transmitting section 15 of the control unit 10 may be implemented not by operation based on the print request program, but by individual hardware circuits. Hereinafter, the same applies to the whole embodiment unless otherwise stated. In addition, the control unit 10 functions as a printer driver section 16 when the processor executes a printer driver PD stored in the HDD 25.

The controller 11 governs the overall operation of the information processing device 1. For example, the controller 11 has a function of controlling the display operation of the display unit 21.

The operation accepting section 12 has a function of accepting an operation performed by the user on the touch panel 22 based on detection signals output from the touch panel 22. The operation accepting section 12 also has a function of accepting an operation performed by the user using the operation unit 20 including hard keys.

The fingerprint information transmission instructing section 13 transmits a user's fingerprint information (biological information), which is acquired by the fingerprint reader 23, from the communication unit 24 to the server 2 through the network N when the operation accepting section 12 accepts a request to start operating the multifunction peripheral 3. Note that the fingerprint information transmission instructing section 13 is an example of a biological information transmission instructing section stated in the appended claims.

When the communication unit 24 receives identification information used to identify the user and an access token and a refresh token generated by a token generator, which will be described later, from the server 2 through the network N, the authentication information receiving section 14 receives the identification information, access token, and refresh token from the communication unit 24, and stores the received identification information, access token, and refresh token in the HDD 25 or the RAM (not shown). In addition, when the communication unit 24 receives a new refresh token from the server 2 through the network N, the authentication information receiving section 14 receives the new refresh token from the communication unit 24, and stores the received new refresh token in the HDD 25 or the RAM (not shown).

When the operation accepting section 12 accepts the first request from the user to log in to the multifunction peripheral 3 to make it usable after the authentication information receiving section 14 has received the identification information, access token, and refresh token, the authentication information transmitting section 15 transmits the identification information and access token stored in the HDD 25 or the other storages from the communication unit 24 to the multifunction peripheral 3 through the network N. In addition, when an authentication information requesting section, which will be described later, makes a request to transmit the identification information and refresh token, the authentication information transmitting section 15 transmits the identification information and refresh token stored in the HDD 25 or the other storages from the communication unit 24 to the multifunction peripheral 3 through the network N. Furthermore, when the authentication information requesting section makes a request to transmit the identification information and a new refresh token, the authentication information transmitting section 15 transmits the identification information and new refresh token stored in the HDD 25 or the other storages from the communication unit 24 to the multifunction peripheral 3 through the network N.

When the operation accepting section 12 accepts the login request after the user has logged out from the multifunction peripheral 3 to make it unusable, the authentication information transmitting section 15 transmits the identification information stored in the HDD 25 or the other storages from the communication unit 24 to the multifunction peripheral 3 through the network N. In addition, when the operation accepting section 12 accepts the login request after the user has logged out from the multifunction peripheral 3 subsequent to the authentication information requesting section transmitting the request for transmission of the identification information and refresh token, the authentication information transmitting section 15 transmits the identification information stored in the HDD 25 or the other storages from the communication unit 24 to the multifunction peripheral 3 through the network N. Furthermore, when the operation accepting section 12 accepts the login request after the user has logged out from the multifunction peripheral 3 subsequent to the authentication information requesting section transmitting the request for transmission of the identification information and a new refresh token, the authentication information transmitting section 15 transmits the identification information stored in the HDD 25 or the other storages from the communication unit 24 to the multifunction peripheral 3 through the network N.

When the communication unit 24 receives authorization information, which will be described later, from the multifunction peripheral 3 after the operation accepting section 12 has accepted the request to log in to the multifunction peripheral 3, the controller 11 makes transmission of a print job (i.e., an action to instruct the multifunction peripheral 3 to perform a print-related operation) to the multifunction peripheral 3. When the transmission of a print job (i.e., an action to instruct the multifunction peripheral 3 to perform a print-related operation) to the multifunction peripheral 3 is completed after the information processing device 1 has logged in to the multifunction peripheral 3, the controller 11 transmits logout request information that is a request to log out from the multifunction peripheral 3.

The controller 11 also retrieves document data from the HDD 25 or from a storage outside the information processing device 1, for example, the server 2 connected to the communication unit 24 through the network N, in response to instructions input by the user through the operation unit 20 and touch panel 22.

The document data is, for example, data files created with various applications, such as word processing software, spreadsheet software, graphics software, executed by the information processing device 1, or image data formatted in JPEG PDF, etc. However, the document data is not formatted to be compatible with the multifunction peripheral 3 to print it, and therefore the multifunction peripheral 3 cannot directly use the document data for print processing.

The printer driver section 16 converts document data selected by the user into data in a page-description language compatible with the multifunction peripheral 3 in accordance with the user's operational instruction accepted by the operation accepting section 12, and uses the converted data in the compatible page-description language to create a print job (e.g., PRN file) containing target print data produced under print conditions specified by the user.

The operation unit 20 includes a keyboard composed of hard keys, a mouse, a pointing device, and so on, and is used by the user to input instructions to select target document data and print conditions, and for various purposes.

The display unit 21 is a device, such as a liquid crystal display and an organic electroluminescent display. The display unit 21 displays a screen to input instructions for the multifunction peripheral 3 to perform print processing, and also displays other various types of screens under the control of the controller 11.

The display unit 21 has the touch panel 22 on the front side. The touch panel 22 is a so-called resistive touch panel or a capacitive touch panel that detects a contact (touch) made by the user on the touch panel 22, and also the position of the contact. Upon detecting the user's (owner's) contact, the touch panel 22 outputs a detection signal representing the coordinates of the contact point to the operation accepting section 12 or other components.

The fingerprint reader 23 is equipped with, for example, a well-known fingerprint sensor that reads a fingerprint of user's index finger. The user places his/her index finger on the fingerprint sensor that, in turn, reads and acquires fingerprint information of the index finger. Note that the fingerprint reader 23 is an example of a biological information acquiring section in the appended claims.

The communication unit 24 includes a communication module, such as a LAN board, and transmits and receives various types of data with the server 2 and multifunction peripheral 3 through the network N connected to the communication unit 24 under the control of the controller 11 or other components. Note that the communication unit 24 is an example of a first communication unit in the appended claims.

The hard disk drive (HDD) 25 is a large-capacity storage device that stores the aforementioned applications and document data created with the applications. The HDD 25 stores printer driver PD in advance. Note that the HDD 25 is an example of a first storage unit in the appended claims.

Figure 3:
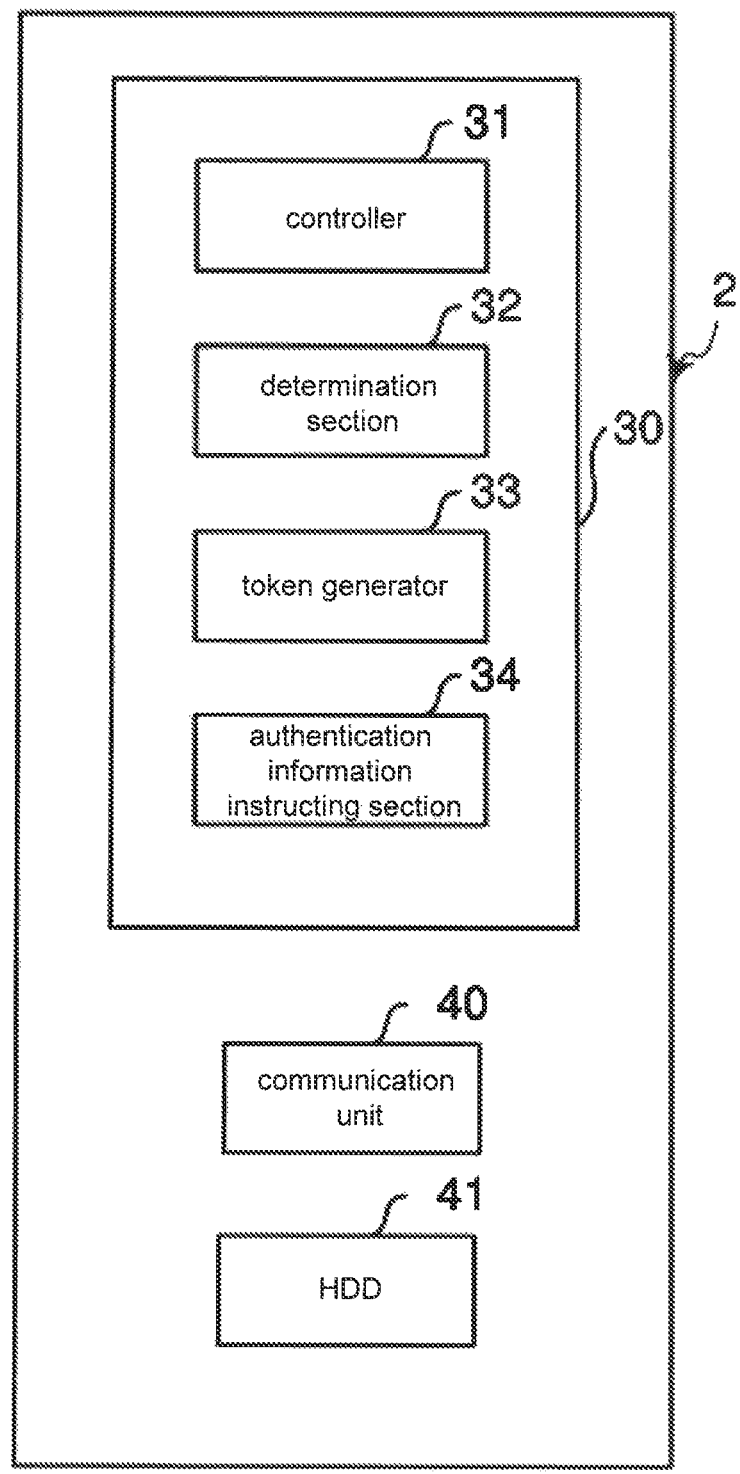
FIG. 3 is a functional block diagram showing main elements of a server.

With reference to FIG. 3, a detailed description of the aforementioned server 2 will be given. FIG. 3 is a functional block diagram showing main elements of the server 2.

As shown in FIG. 3, the server 2 includes a control unit 30, a communication unit 40, and a HDD 41. These components are configured to be capable of receiving and transmitting data or signals through a CPU bus. The control unit 30 is composed of a processor, a random access memory (RAM), a read only memory (ROM), and some other components. The processor is, for example, a central processing unit (CPU), MPU, or ASIC. Running a print management program stored in the HDD 41 or the other storages by the processor allows the control unit 30 to function as a controller 31, a determination section 32, a token generator 33, and an authentication information instructing section 34. However, the controller 31, determination section 32, token generator 33, and authentication information instructing section 34 of the control unit 30 may be implemented not by operation based on the print management program, but by individual hardware circuits. Hereinafter, the same applies to the whole embodiment unless otherwise stated.

The controller 31 governs the overall operation of the server 2.

When the communication unit 40 receives fingerprint information (biological information) from the information processing device 1 through the network N, the determination section 32 determines whether the fingerprint information received by the communication unit 40 matches fingerprint information stored in the HDD 41.

If the determination section 32 determines that the fingerprint information received by the communication unit 40 matches the fingerprint information stored in the HDD 41, the token generator 33 generates an access token and a refresh token. In addition, if an authentication information issue requesting section, which will be described later, makes a request to issue a new refresh token, the token generator 33 generates a new refresh token.

The access token is authentication information (password) that is used when the user of the information processing device 1 logs in to the multifunction peripheral 3, and becomes invalid once it is used for login operation between the information processing device 1 and multifunction peripheral 3. Similarly, the refresh token is authentication information (password) that is used when the user of the information processing device 1 logs in to the multifunction peripheral 3, and becomes invalid once it is used for login operation between the information processing device 1 and multifunction peripheral 3. In addition, the refresh token is used when the user of the information processing device 1 logs in to the multifunction peripheral 3 again after the user logged in to the multifunction peripheral 3 using an access token. The access token and refresh token are character codes each composed of, for example, a combination of 32 alphanumeric characters (e.g., "123e4567-e89b-12d3-a456-426655440000"). Since the refresh token is used after the user of the information processing device 1 is authenticated with the access token, the refresh token can be composed of characters fewer in number than those of the access token.

The access token has validated periods specified by a first predesignated time (e.g., three minutes) and a third predesignated time (e.g., thirty minutes), and the validated periods are set in the multifunction peripheral 3 when the access token is used for login. The user of the information processing device 1 can use the multifunction peripheral 3 by using only the identification information if it is within the first predesignated time after the access token was used to log in to the multifunction peripheral 3. The multifunction peripheral 3 can request the server 2 to issue a new refresh token if it is within the third predesignated time after the access token was used for login.

The refresh token has a validated period specified by a second predesignated time (e.g., three minutes), and the validated period is set in the multifunction peripheral 3 when the refresh token is used for login. The user of the information processing device 1 can use the multifunction peripheral 3 by using only the identification information if it is within the second predesignated time after the refresh token was used for login. Similarly, the new refresh token has a validated period specified by a fourth predesignated time (e.g., three minutes), and the validated period is set in the multifunction peripheral 3 when the new refresh token is used for login. The user of the information processing device 1 can use the multifunction peripheral 3 by using only the identification information if it is within the fourth predesignated time after the new refresh token was used for login.

When the token generator 33 generates an access token and refresh token, the authentication information instructing section 34 acquires the identification information of the user, whose fingerprint information was determined by the determination section 32 to match the fingerprint information in the HDD 41, from the HDD 41, and transmits the acquired identification information, and the access token and refresh token generated by the token generator 33 from the communication unit 40 to the information processing device 1 and multifunction peripheral 3 through the network N. In addition, when the token generator 33 generates a new refresh token, the authentication information instructing section 34 transmits the new refresh token generated by the token generator 33 from the communication unit 40 to the information processing device 1 and multifunction peripheral 3 through the network N.

The communication unit 40 includes a communication module, such as a LAN board, and transmits and receives various types of data with the information processing device 1, multifunction peripheral 3, and other devices through the network N connected to the communication unit 40 under the control of the controller 31. Note that the communication unit 40 is an example of a second communication unit in the appended claims.

The HDD 41 is a large-capacity storage device, and stores in advance fingerprint information of individual users who are authorized to use the multifunction peripheral 3, and the user's identification information associated with the fingerprint information. The identification information stored in advance in the HDD 41 is, for example, IP address of the information processing device 1 operated by the user who is authorized to use the multifunction peripheral 3. Note that the HDD 41 is an example of a second storage unit in the appended claims.

Figure 4:
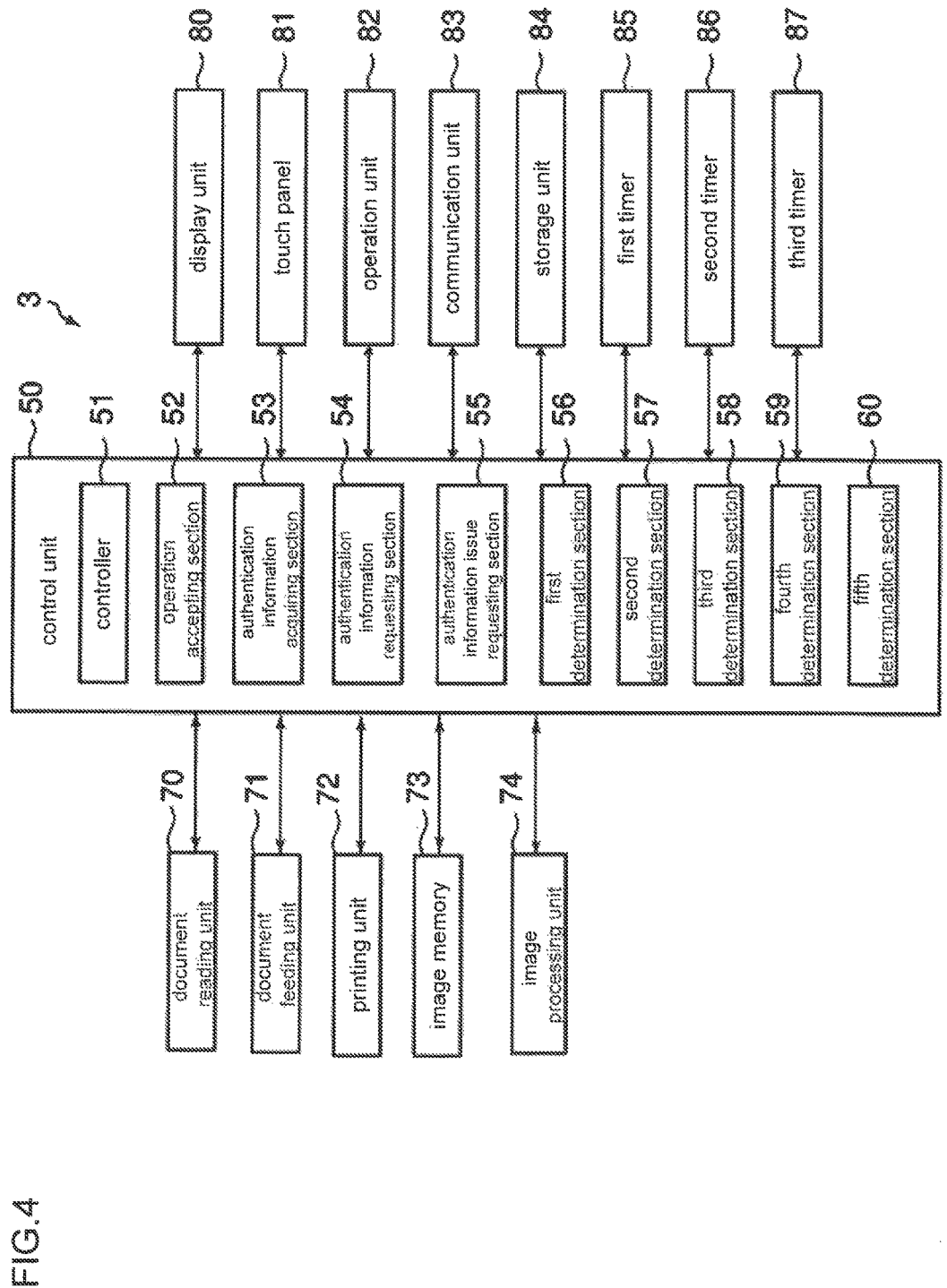
FIG. 4 is a functional block diagram showing main elements of a multifunction peripheral.

Referring to FIG. 4, a detailed description will be given about the multifunction peripheral 3 according to the embodiment. FIG. 4 is a functional block diagram showing main elements of the multifunction peripheral 3.

As shown in FIG. 4, the multifunction peripheral 3 is a multifunction printer having a plurality of functions, for example, a copying function, a printing function, a scanning function, and a facsimile function. The multifunction peripheral 3 includes a control unit 50. The control unit 50 includes a CPU, a RAM, a ROM, specific hardware circuitry, and some other components, and governs the overall operation of the multifunction peripheral 3.

The multifunction peripheral 3 includes a document reading unit 70, a document feeding unit 71, a printing unit 72, an image memory 73, an image processing unit 74, a display unit 80, a touch panel 81, an operation unit 82, a communication unit 83, a storage unit 84, a first timer 85, a second timer 86, and a third timer 87.

When the multifunction peripheral 3 performs document reading operation, the document reading unit 70 optically reads images of the document fed by the document feeding unit 71 to generate image data.

When the multifunction peripheral 3 performs image forming operation (i.e., printing operation), a controller, which will be described later, of the control unit 50 controls the printing unit 72 to perform print processing on paper, which is print media fed by a feeding unit (not shown), based on the image data generated through the document reading operation, print job transmitted from the information processing device 1 and stored in the shared storage area, and other types of print jobs, and resultantly the images are formed on the paper.

The document reading unit 70 includes a reading mechanism (not shown) composed of a light emitting unit, a CCD sensor, and other components. The reading mechanism operates under the control of the control unit 50. The document reading unit 70 reads the image of a document by emitting light from the light emitting unit to the document and receiving the reflected light with the CCD sensor, and generates image data of the image.

The image memory 73 is a storage area that temporarily stores image data of the document images read out by the document reading unit 70, and print processing data to be printed by the printing unit 72.

The image processing unit 74 retrieves an image read by the document reading unit 70 from the image memory 73, and performs image processing on the image. The image processing performed by the image processing unit 74 is preprogrammed image processing, for example, shading compensation, and is performed to make the quality of the image read by the document reading unit 70 better after being reproduced by the printing unit 72.

The printing unit 72 forms the image of image data read out by the document reading unit 70, the image of print jobs provided from the information processing device 1, and so on. More specifically, when the printing unit 72 performs color printing, an image forming unit for magenta, an image forming unit for cyan, an image forming unit for yellow, and an image forming unit for black of the printing unit 72 respectively form toner images on the photoreceptor drums, based on the image composed of the respective colors making up image data, through charging, exposing and developing processes, and then the toner images are transferred from a primary transfer roller onto an intermediate transfer belt (not shown).

The toner images of respective colors to be transferred onto the intermediate transfer belt are overlaid on one another on the intermediate transfer belt with adjusted transfer timing to form a color toner image. A secondary transfer roller transfers the color toner image, which is formed on the surface of the intermediate transfer belt, onto paper, which is sent through a transport path from the paper feeding unit, at a nip portion provided between a driving roller and the secondary transfer roller with the intermediate transfer belt sandwiched therebetween. Subsequently, a fusing unit fixes the toner image on the paper by thermocompression bonding (not shown). After the completion of the fusing process, the paper with the color image formed thereon is ejected onto an ejection tray (not shown).

The display unit 80 includes a liquid crystal display, an organic electroluminescent display, or the like.

The display unit 80 has a touch panel 81 on the front side. The touch panel 81 is a so-called resistive touch panel or a capacitive touch panel, and detects a contact (touch) made by the user on the touch panel 81, and also the position of the contact. Upon detecting the user's contact, the touch panel 81 outputs a detection signal representing the coordinates of the contact point to an operation accepting section 52, which will be described later.

The operation unit 82 includes hard keys, for example, a menu key to bring up a menu screen, arrow keys to move focus on the GUI making up the menu, and an enter key to accept the operation on the GUI making up the menu.

The communication unit 83 includes a communication module, such as a LAN board, and transmits and receives various types of data with the information processing device 1, server 2, and other devices through the network N connected to the communication unit 83 under the control of a controller 51, which will be described later. Note that the communication unit 83 is an example of a third communication unit in the appended claims.

The storage unit 84 is a large-capacity storage device, such as a hard disk drive (HDD) and a solid state drive (SSD). Note that the storage unit 84 is an example of a third storage unit in the appended claims.

The first timer 85 counts time elapsed from the time that the communication unit 83 has received identification information, an access token, and a refresh token from the information processing device 1 through the network N. The validated periods specified by the first and third predesignated times of the access token are set in the multifunction peripheral 3 as the first timer 85 counts the elapsed time.

The second timer 86 counts time elapsed from a point of time that the communication unit 83 has received identification information and a refresh token from the information processing device 1 through the network N. The validated period specified by the second predesignated time of the refresh token is set in the multifunction peripheral 3 as the second timer 86 counts the elapsed time.

The third timer 87 counts time elapsed from a point of time that the communication unit 83 has received identification information and a new refresh token from the information processing device 1 through the network N. The validated period specified by the fourth predesignated time of the new refresh token is set in the multifunction peripheral 3 as the third timer 87 counts the elapsed time.

The control unit 50 includes a CPU, a ROM, a RAM, and some other components, and governs the whole operation of the multifunction peripheral 3. The control unit 50 includes a controller 51, an operation accepting section 52, an authentication information acquiring section 53, an authentication information requesting section 54, an authentication information issue requesting section 55, a first determination section 56, a second determination section 57, a third determination section 58, a fourth determination section 59, and a fifth determination section 60.

The control unit 50 is composed of a processor, a random access memory (RAM), a read only memory (ROM), and some other components. The processor is, for example, a central processing unit (CPU), MPU, or ASIC. Running a print execution program stored in the storage unit 84 or the other storages by the processor allows the control unit 50 to function as the controller 51, operation accepting section 52, authentication information acquiring section 53, authentication information requesting section 54, authentication information issue requesting section 55, first determination section 56, second determination section 57, third determination section 58, fourth determination section 59, and fifth determination section 60. However, the controller 51, operation accepting section 52, authentication information acquiring section 53, authentication information requesting section 54, authentication information issue requesting section 55, first determination section 56, second determination section 57, third determination section 58, fourth determination section 59, and fifth determination section 60 may be implemented not by operation based on the print execution program, but by individual hardware circuits. Hereinafter, the same applies to the whole embodiment unless otherwise stated.

The controller 51 that governs the whole operation of the multifunction peripheral 3 is connected to the document reading unit 70, document feeding unit 71, printing unit 72, image memory 73, image processing unit 74, display unit 80, touch panel 81, operation unit 82, communication unit 83, storage unit 84, first timer 85, second timer 86, third timer 87, and other components to controllably actuate these components.

The operation accepting section 52 has a function of accepting the operation performed by the user on the touch panel 81 based on detection signals output from the touch panel 81. The operation accepting section 52 also has a function of accepting the operation performed by the user using the operation unit 82, such as hard keys.

When the communication unit 83 receives identification information, an access token, and a refresh token from the server 2 through the network N, the authentication information acquiring section 53 acquires the identification information, access token, and refresh token received by the communication unit 83, and stores the acquired identification information, access token, and refresh token in the storage unit 84. In addition, when the communication unit 83 receives a new refresh token from the server 2 through the network N, the authentication information acquiring section 53 acquires the new refresh token received by the communication unit 83, and stores acquired the new refresh token in the storage unit 84.

When the second determination section 57 determines that the elapsed time counted by the first timer 85 has exceeded the first predesignated time when the communication unit 83 received the identification information from the information processing device 1 through the network N, the authentication information requesting section 54 issues a request for transmission of identification information and a refresh token from the communication unit 83 to the information processing device 1 through the network N. In addition, when a new refresh token is stored in the storage unit 84, the authentication information requesting section 54 issues a request for transmission of identification information and the new refresh token to the image processing device 1.

When the communication unit 83 receives identification information from the information processing device 1 through the network N under circumstances where the third determination section 58 determines that the elapsed time counted by the second timer 86 has exceeded the second predesignated time, and the fourth determination section 59 determines that the elapsed time counted by the first timer 85 is within the third predesignated time, the authentication information issue requesting section 55 transmits a request for issue of a new refresh token from the communication unit 83 to the server 2 through the network N.

When the communication unit 83 receives identification information and an access token from the information processing device 1 through the network N, the first determination section 56 determines whether the identification information received by the communication unit 83 matches the identification information stored in the storage unit 84, and also determines whether the access token received by the communication unit 83 matches the access token stored in the storage unit 84. In addition, when the communication unit 83 receives identification information from the information processing device 1 through the network N, the first determination section 56 determines whether the identification information received by the communication unit 83 matches the identification information stored in the storage unit 84.

When the communication unit 83 receives identification information and refresh token from the information processing device 1 through the network N, the first determination section 56 determines whether the identification information received by the communication unit 83 matches the identification information stored in the storage unit 84, and also determines whether the refresh token received by the communication unit 83 matches the refresh token stored in the storage unit 84. In addition, when the communication unit 83 receives identification information and a new refresh token from the information processing device 1 through the network N, the first determination section 56 determines whether the identification information received by the communication unit 83 matches the identification information stored in the storage unit 84, and also determines whether the new refresh token received by the communication unit 83 matches the new refresh token stored in the storage unit 84.

The second determination section 57 determines whether the elapsed time counted by the first timer 85 is within the first predesignated time. In other words, the second determination section 57 determines whether the elapsed time counted by the first timer 85 is within the validated period of an access token specified by the first predesignated time.

The third determination section 58 determines whether the elapsed time counted by the second timer 86 is within the second predesignated time (e.g., three minutes). In other words, the third determination section 58 determines whether the elapsed time counted by the second timer 86 is within the validated period of a refresh token specified by the second predesignated time.

The fourth determination section 59 determines whether the elapsed time counted by the first timer 85 is within the third predesignated time (e.g., thirty minutes). In other words, the fourth determination section 59 determines whether the elapsed time counted by the first timer 85 is within the validated period of an access token specified by the third predesignated time.

The fifth determination section 60 determines whether the elapsed time counted by the third timer 87 is within the fourth predesignated time (e.g., three minutes). In other words, the fifth determination section 60 determines whether the elapsed time counted by the third timer 87 is within the validated period of a new refresh token specified by the fourth predesignated time.

The controller 51 authorizes or does not authorize the information processing device 1 to use the multifunction peripheral 3 in accordance with the determination results from the first determination section 56, second determination section 57, third determination section 58, fourth determination section 59, and fifth determination section 60. If the controller 51 authorizes the information processing device 1 to use the multifunction peripheral 3, the controller 51 controls the communication unit 83 to transmit authorization information to the information processing device 1 through the network N. On the other hand, if the controller 51 does not authorize the information processing device 1 to use the multifunction peripheral 3, the controller 51 controls the communication unit 83 to transmit non-authorization information to the information processing device 1 through the network N. The authorization information describes that the use of the multifunction peripheral 3 is permitted, while the non-authorization information describes that the use of the multifunction peripheral 3 is not permitted. In addition, when the communication unit 83 receives a log-out request information from the information processing device 1, the controller 51 controls the communication unit 83 to log out the information processing device 1 so that the user of the multifunction peripheral 3 cannot use the multifunction peripheral 3.

Referring to FIGS. 5 to 20, a detailed description will be given about operation of the image forming system 100 according to the embodiment.

Figure 5:
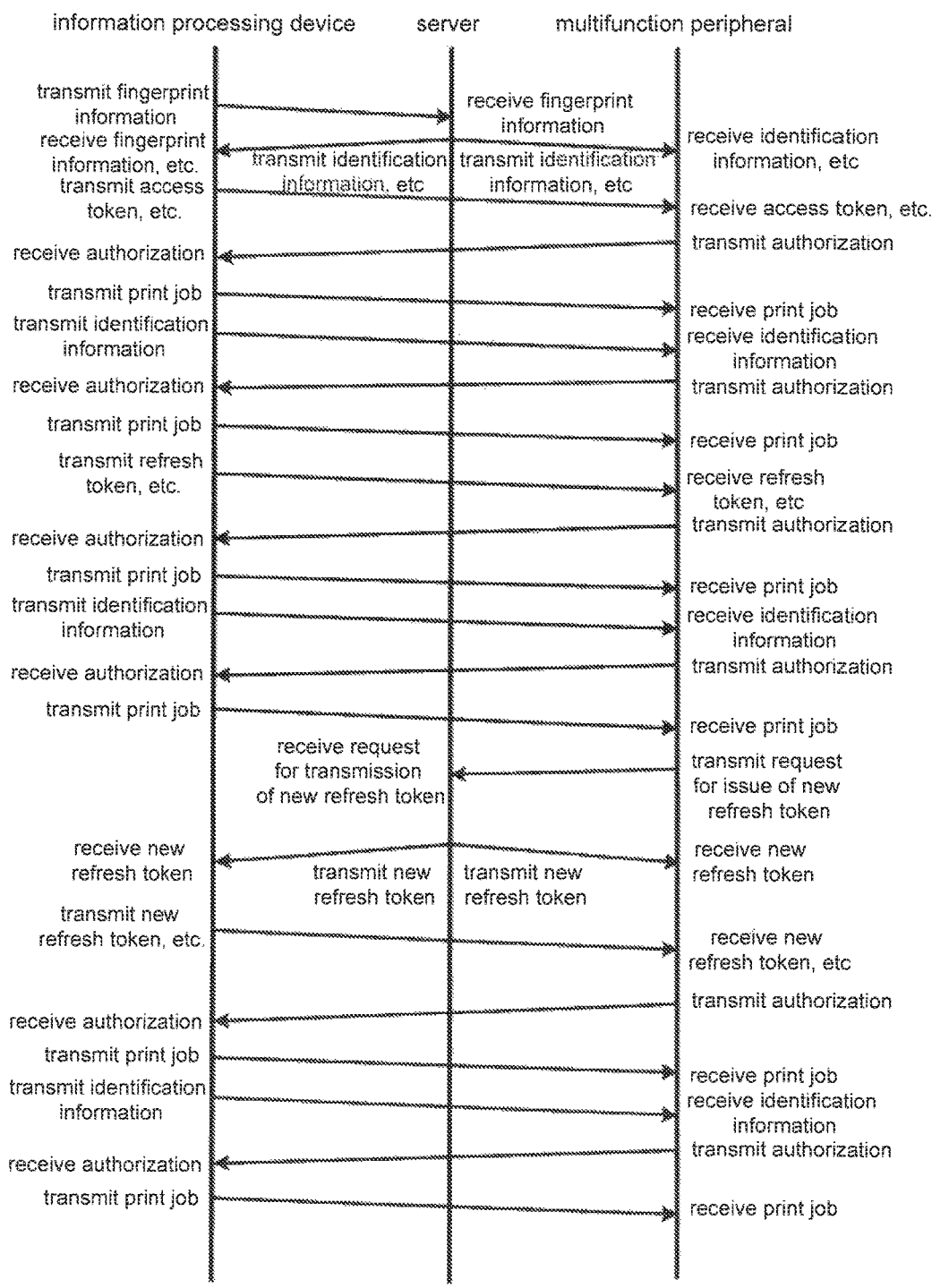
FIG. 5 schematically illustrates a communication procedure between the information processing device, server, and multifunction peripheral.
Figure 6:
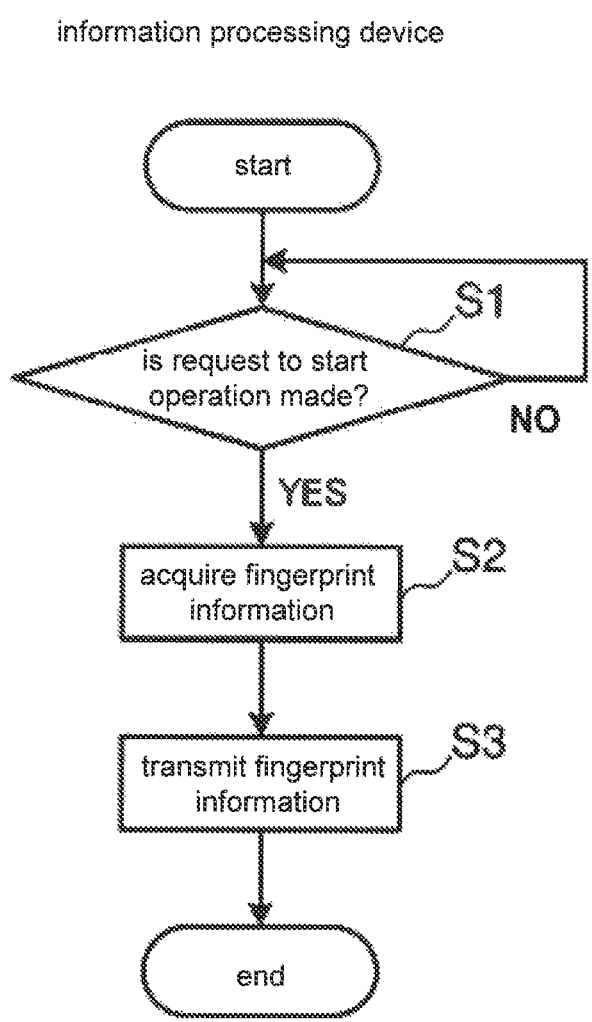
FIG. 6 is a flowchart of a process performed by the information processing device.
Figure 7:
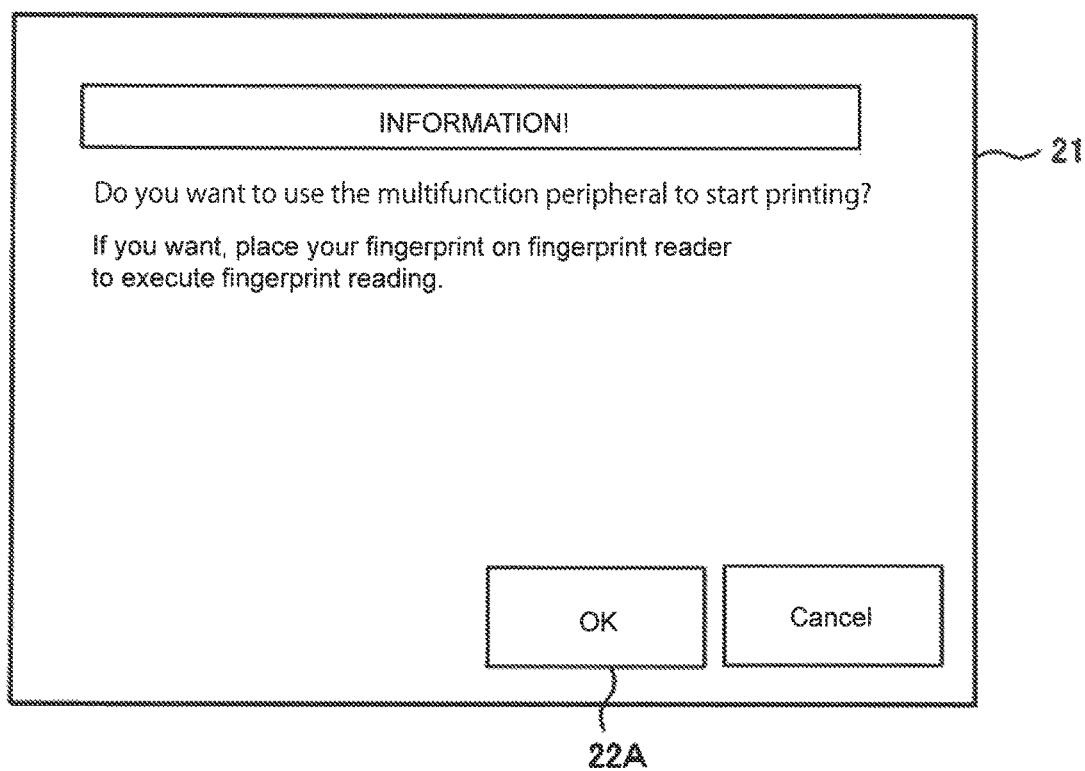
FIG. 7 illustrates an example of a display screen displayed on a display unit of the information processing device.
Figure 8:
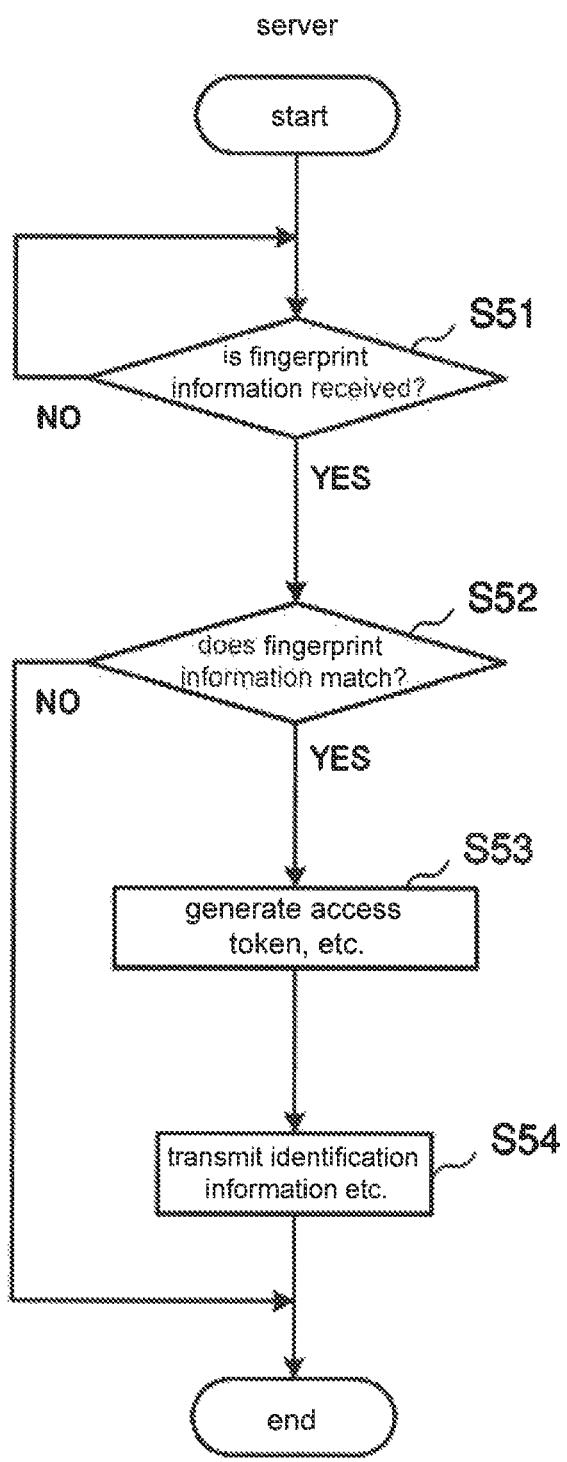
FIG. 8 is a flowchart of a process performed by the server.

First, with reference to FIGS. 5 to 8, a user authentication process using fingerprint information at the server 2 will be described in detail. FIG. 5 schematically illustrates a communication procedure between the information processing device, server, and multifunction peripheral. FIG. 6 is a flowchart of a process performed by the information processing device. FIG. 7 illustrates an example of a display screen displayed on a display unit of the information processing device. FIG. 8 is a flowchart of a process performed by the server.

As shown in FIG. 6, the controller 11 of the information processing device 1 determines whether the operation accepting section 12 has accepted a request made by a user to start operating the multifunction peripheral 3 (S1). For example, as shown in FIG. 7, the controller 11 controls the display unit 21 to display a display screen that prompts the user to enter an instruction to start print processing using the multifunction peripheral 3 and to start reading fingerprint information. Then, the controller 11 determines whether a request to start print processing using the multifunction peripheral 3 has been made by detecting whether the user has selected an OK key 22A on the display screen shown in FIG. 7. If the touch panel 22 does not detect the selection of the OK key 22A (NO in S1), the controller 11 brings the information processing device 1 into a standby state without proceeding to S2.

If, on the other hand, the touch panel 22 detects that the OK key 22A has been selected by the user and accepted through the touch panel 22 (YES in S1), the controller 11 determines that it has been instructed to start print processing using the multifunction peripheral 3. Then, the user places his/her index finger on the fingerprint reader 23, and the fingerprint reader 23 acquires fingerprint information of the index finger placed thereon (S2). After that, the fingerprint information transmission instructing section 13 transmits the user's fingerprint information acquired by the fingerprint reader 23 from the communication unit 24 to the server 2 through the network N (S3).

As shown in FIG. 8, the controller 31 of the server 2 determines whether the communication unit 40 has received the fingerprint information from the information processing device 1 (S51). If the controller 31 determines that the communication unit 40 has not received the fingerprint information from the information processing device 1 (NO in S51), the controller 31 brings the server 2 into a standby state without proceeding to S52.

If, on the other hand, the controller 31 determines that the communication unit 40 has received the fingerprint information from the information processing device 1 (YES in S51), the controller 31 determines that the information processing device 1 has requested the use of the multifunction peripheral 3. Then, the determination section 32 determines whether the fingerprint information received by the communication unit 40 matches fingerprint information stored in the HDD 41 (S52). If the determination section 32 determines that the fingerprint information received by the communication unit 40 does not match the fingerprint information stored in the HDD 41 (NO in S52), the controller 31 determines not to authorize the information processing device 1 to use the multifunction peripheral 3, and terminates the process. Besides the above-described description, the controller 31 can be configured to control the communication unit 40 to transmit a message to the information processing device 1 through the network N to inform that the use of the multifunction peripheral 3 is not authorized.

If, on the other hand, the determination section 32 determines that the fingerprint information received by the communication unit 40 matches the fingerprint information stored in the HDD 41 (YES in S52), the controller 31 determines to authorize the information processing device 1 to use the multifunction peripheral 3. Subsequently, the token generator 33 generates an access token and a refresh token (S53).

The authentication information instructing section 34 acquires the identification information of the user, whose fingerprint information has been determined by the determination section 32 to match the fingerprint information stored in the HDD 41, and transmits acquired the identification information, and access token and refresh token generated by the token generator 33 from the communication unit 40 to the information processing device 1 and multifunction peripheral 3 through the network N (S54). The user authentication process performed by the server 2 using fingerprint information is executed as described above.

Figure 9:
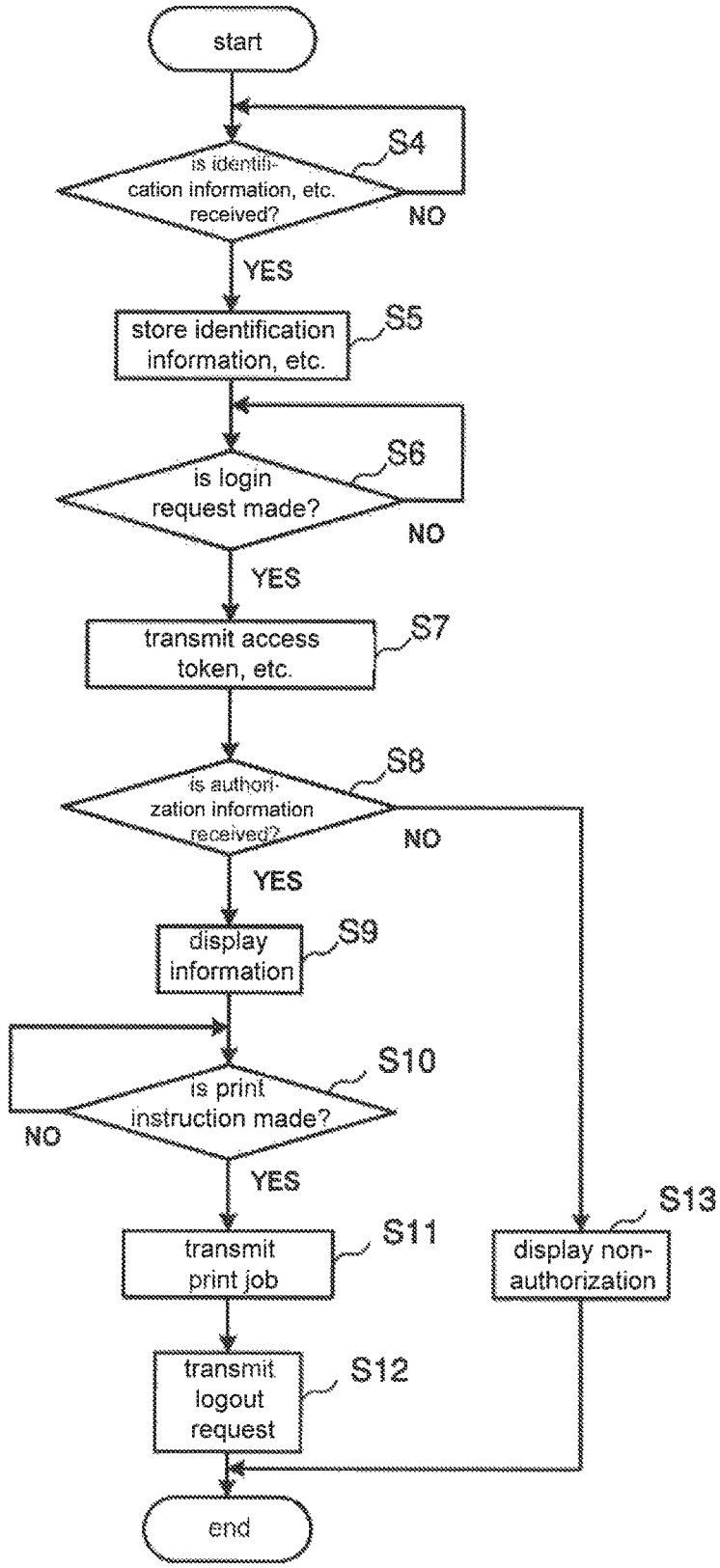
FIG. 9 is a flowchart of another process performed by the information processing device.
Figure 10:
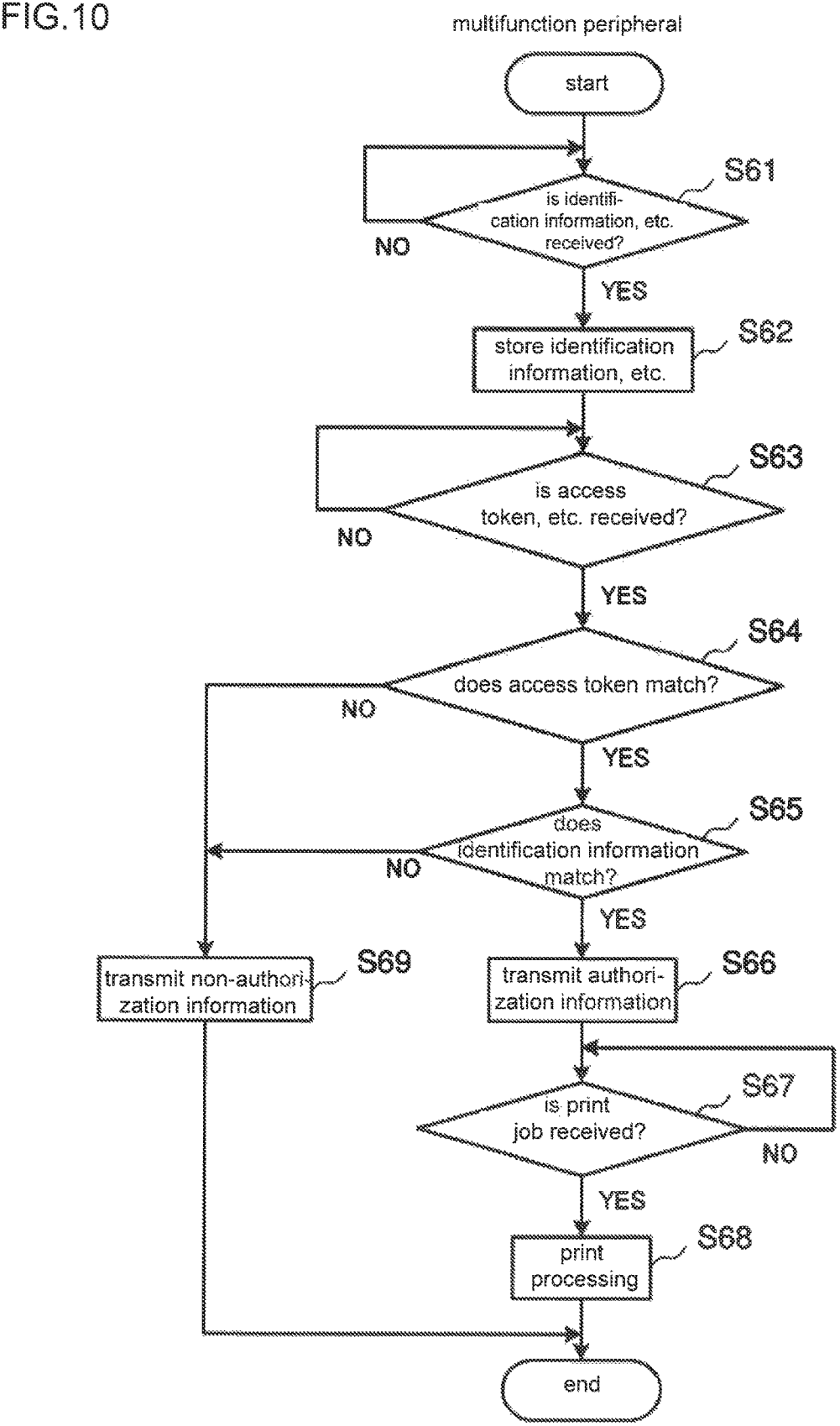
FIG. 10 is a flowchart of a process performed by the multifunction peripheral.
Figure 11:
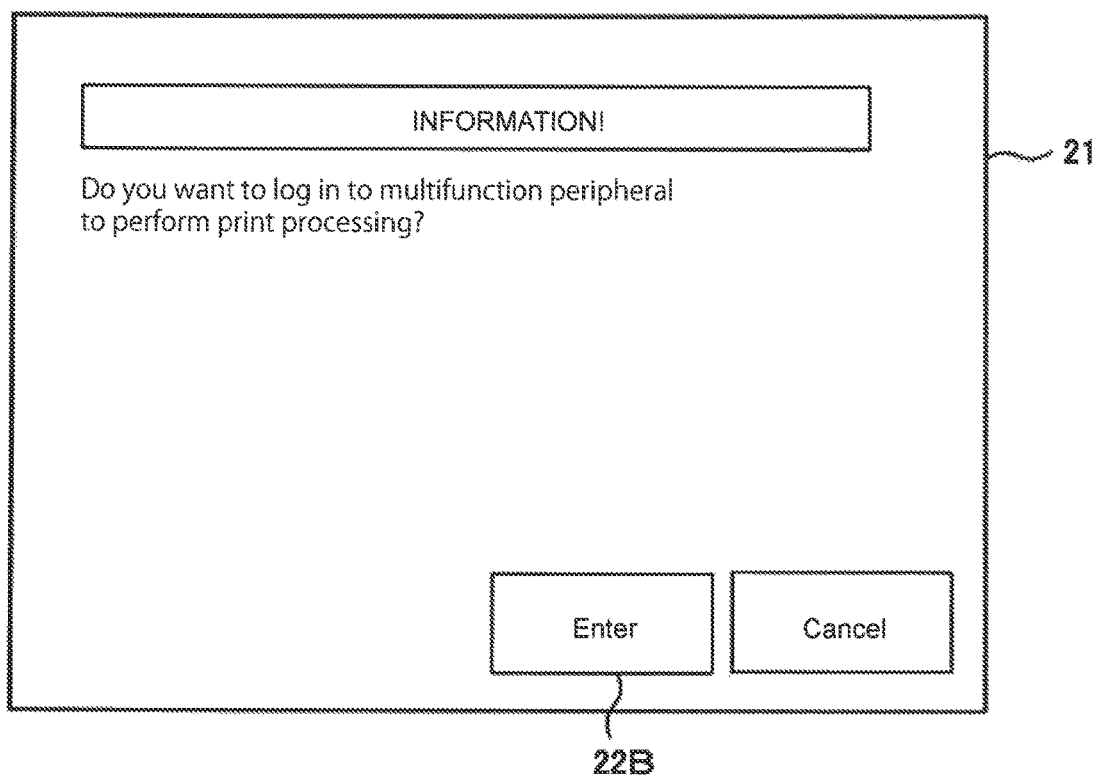
FIG. 11 illustrates an example of a display screen displayed on the display unit of the information processing device.
Figure 12:
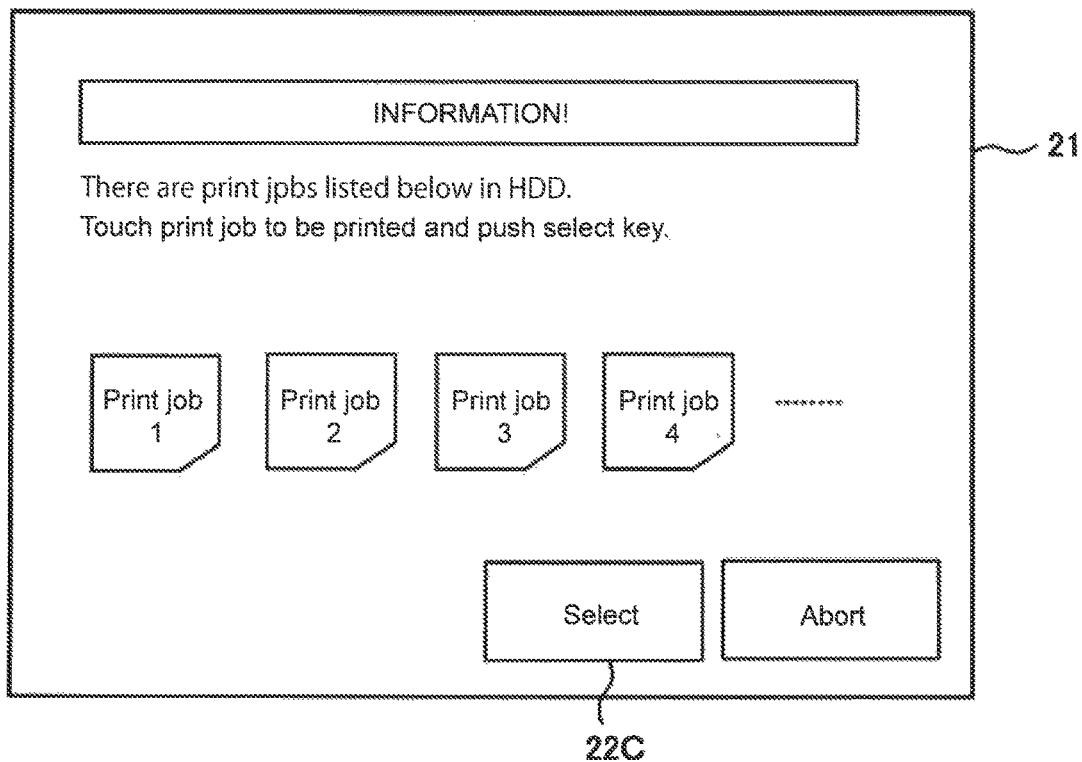
FIG. 12 illustrates an example of a display screen displayed on the display unit of the information processing device.

Next, with reference to FIGS. 5 and 9 to 12, a login process between the information processing device 1 and multifunction peripheral 3 using an access token will be described. FIG. 9 is a flowchart of another process performed by the information processing device. FIG. 10 is a flowchart of a process performed by the multifunction peripheral. FIG. 11 illustrates an example of a display screen displayed on the display unit of the information processing device. FIG. 12 illustrates an example of a display screen displayed on the display unit of the information processing device.

As shown in FIG. 9, the controller 11 of the information processing device 1 determines whether the communication unit 24 has received identification information, an access token, and a refresh token from the server 2 (S4). If the controller 11 determines that the communication unit 24 has not received the identification information, access token, and refresh token from the server 2 (NO in S4), the controller 11 brings the information processing device 1 into a standby state without proceeding to S5.

If, on the other hand, the controller 11 determines that the communication unit 24 has received the identification information, access token, and refresh token from the server 2 (YES in S4), the authentication information receiving section 14 receives the identification information, access token, and refresh token from the communication unit 24, and stores the received identification information, access token, and refresh token in the HDD 25 or the other storages unit (S5).

The controller 11 determines whether the operation accepting section 12 has accepted the first request made by the user to log in to the multifunction peripheral 3 (S6). For example, as shown in FIG. 11, the controller 11 controls the display unit 21 to display a display screen prompting the user to log in to the multifunction peripheral 3 to perform print processing. Then, the controller 11 detects whether the user has selected an enter key 22B on the display screen shown in FIG. 11 to determine whether the first request to log in to the multifunction peripheral 3 has been made. If the touch panel 22 does not detect the selection of the enter key 22B (NO in S6), the controller 11 brings the information processing device 1 into a standby state without proceeding to S7.

If, on the other hand, the touch panel 22 detects that the enter key 22B has been selected by the user and accepted through the touch panel 22 (YES in S6), the controller 11 determines that it has been instructed to log in to the multifunction peripheral 3 for the first time in this process. In addition, the controller 11 determines that it has been instructed to perform the first login procedure when detecting that the access token has not been retrieved from the HDD 25 (i.e., the access token has not been transmitted to the multifunction peripheral 3), while the controller 11 determines that it has been instructed to perform the second or the following login procedures when detecting that the access token has been retrieved from the HDD 25 (i.e., the access token has been transmitted to the multifunction peripheral 3).

Next, the authentication information transmitting section 15 transmits the identification information and access token stored in the HDD 25 or the other storages from the communication unit 24 to the multifunction peripheral 3 through the network N (S7).

As shown in FIG. 10, the controller 51 of the multifunction peripheral 3 determines whether the communication unit 83 has received the identification information, access token, and refresh token from the server 2 (S61). If the controller 51 determines that the communication unit 83 has not received the identification information, access token, and refresh token from the server 2 (NO in S61), the controller 51 brings the multifunction peripheral 3 into a standby state without proceeding to S62.

If, on the other hand, the controller 51 determines that the communication unit 83 has received the identification information, access token, and refresh token from the server 2 (YES in S61), the authentication information acquiring section 53 acquires the identification information, access token, and refresh token received by the communication unit 83, and stores the acquired identification information, access token, and refresh token in the storage unit 84 (S62).

Next, the controller 51 determines whether the communication unit 83 has received the identification information and access token from the information processing device 1 (S63). If the controller 51 determines that the communication unit 38 has not received the identification information and access token from the information processing device 1 (NO in S63), the controller 51 brings the multifunction peripheral 3 into a standby state without proceeding to S64.

If, on the other hand, the controller 51 determines that the communication unit 83 has received the identification information and access token from the information processing device 1 (YES in S63), the controller 51 determines that the information processing device 1 has made a request to use the multifunction peripheral 3. Next, the first determination section 56 determines whether the access token received by the communication unit 83 matches the access token stored in the storage unit 84 (S64). If the first determination section 56 determines that the access token received by the communication unit 83 does not match the access token stored in the storage unit 84 (NO in S64), the controller 51 determines not to authorize the information processing device 1 to use the multifunction peripheral 3, and proceeds to S69, which will be described later.

If, on the other hand, the first determination section 56 determines that the access token received by the communication unit 83 matches the access token stored in the storage unit 84 (YES in S64), the first determination section 56 determines whether the identification information received by the communication unit 83 matches the identification information stored in the storage unit 84 (S65). Subsequently, if the first determination section 56 determines that the identification information received by the communication unit 83 does not match the identification information stored in the storage unit 84 (NO in S65), the controller 51 determines not to authorize the information processing device 1 to use the multifunction peripheral 3, and proceeds to S69.

If, on the other hand, the first determination section 56 determines that the identification information received by the communication unit 83 matches the identification information stored in the storage unit 84 (YES in S65), the controller 51 determines to authorize the information processing device 1 to use the multifunction peripheral 3. Then, the controller 51 controls the communication unit 83 to transmit authorization information to the information processing device 1 through the network N (S66).

If the controller 51 determines not to authorize the information processing device 1 to use the multifunction peripheral 3 in S64 or S65, the controller 51 controls the communication unit 83 to transmit non-authorization information to the information processing device 1 through the network N (S69).

As shown in FIG. 9, the controller 11 of the information processing device 1 determines whether the communication unit 24 has received the authorization information from the multifunction peripheral 3 (S8).

If the controller 11 determines that the communication unit 24 has received the authorization information from the multifunction peripheral 3 (YES in S8), the controller 11 controls the display unit 21 to display a display screen (not shown) to indicate that the use of the multifunction peripheral 3 is authorized (S9). Then, the controller 11 determines whether the operation accepting section 12 has accepted a request made by the user to execute print processing at the multifunction peripheral 3. For example, the controller 11 controls the display unit 21 to display the display screen as shown in FIG. 12 that prompts the user to select a print job the user desires to print using the multifunction peripheral 3. Then, the controller 11 determines whether a request to perform print processing on a print job has been made by detecting whether the user has selected any of a print job 1, a print job 2, a print job 3, and a print job 4, and also selected a select key 22C on the display screen shown in FIG. 12. If the touch panel 22 does not detect that any of the print jobs is selected (NO in S10), the controller 11 brings the information processing device 1 into a standby state without proceeding to S11.

If, on the other hand, the touch panel 22 detects that the print job 1, for example, has been selected by the user and accepted through the touch panel 22, and also the select key 22C has been selected by the user and accepted through the touch panel 22 (YES in S10), the controller 11 determines that it has been instructed to perform print processing on the print job 1. Then, the controller 11 acquires the print job 1 from the HDD 25, and controls the communication unit 24 to transmit the print job 1 to the multifunction peripheral 3 through the network N (S11). Subsequently, the controller 11 transmits logout request information from the multifunction peripheral 3 from the communication unit 24 to the multifunction peripheral 3 through the network N to log out from the multifunction peripheral 3 (S12).

In addition, if the controller 11 determines that the communication unit 24 has not received the authorization information from the multifunction peripheral 3, or has received non-authorization information (NO in S8), the controller 11 controls the display unit 21 to display a display screen (not shown) to indicate that the use of the multifunction peripheral 3 is not authorized (S13), and terminates the process.

As shown in FIG. 10, the controller 51 of the multifunction peripheral 3 determines whether the communication unit 83 has received a print job from the information processing device 1 (S67). If the controller 51 determines that the communication unit 83 has not received the print job from the information processing device 1 (NO in S67), the controller 51 brings the multifunction peripheral 3 into a standby state without proceeding to S68.

If, on the other hand, the controller 51 determines that the communication unit 83 has received the print job from the information processing device 1 (YES in S67), the controller 51 controls the printing unit 72 to perform print processing on the print job (S68). Subsequently, if the communication unit 83 receives the logout request information from the information processing device 1, the controller 51 controls the communication unit 83 to log out the information processing device 1 so that the user of the information processing device 1 cannot use the multifunction peripheral 3 (not shown).

Figure 13:
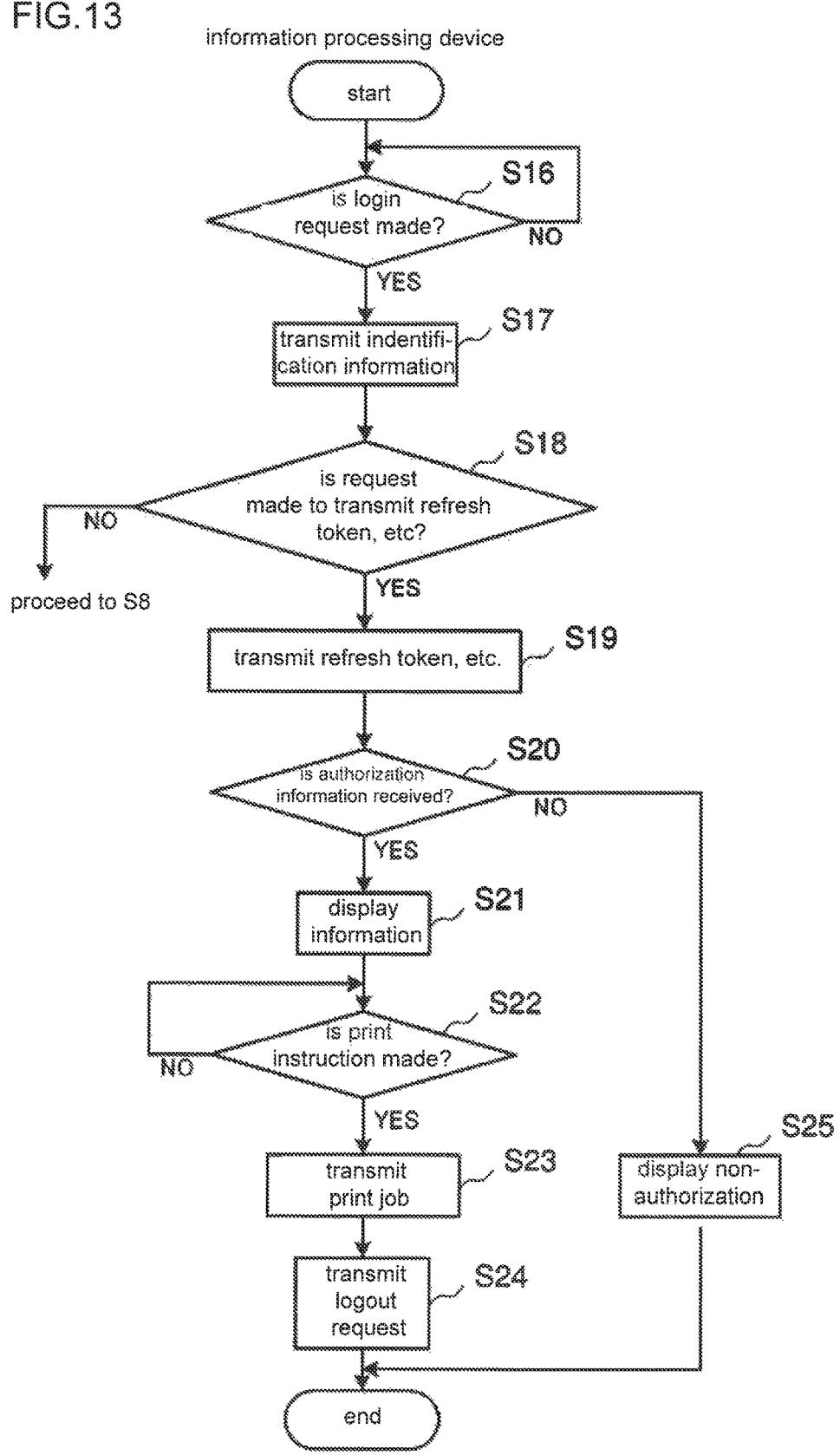
FIG. 13 is a flowchart of yet another process performed by the information processing device.
Figure 14:
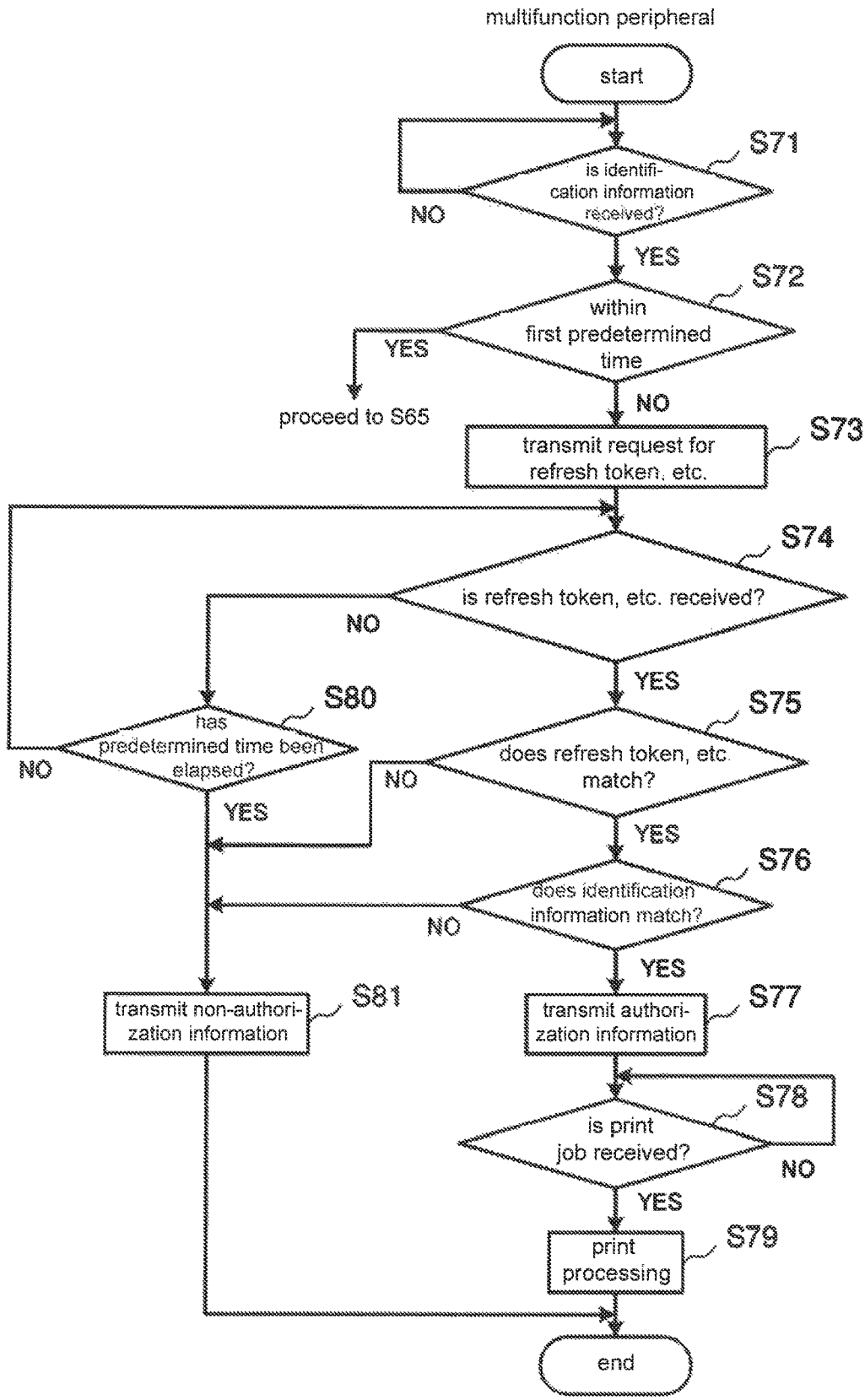
FIG. 14 is a flowchart of another process performed by the multifunction peripheral.

With reference to FIGS. 5, 13, and 14, a description will be made concretely about a process using identification information and a login process using a refresh token after the information processing device 1 logs in to the multifunction peripheral 3 using an access token. FIG. 13 is a flowchart of yet another process performed by the information processing device. FIG. 14 is a flowchart of another process performed by the multifunction peripheral.

As shown in FIG. 13, the controller 11 of the information processing device 1 determines whether the operation accepting section 12 has accepted a request made by a user to log in to the multifunction peripheral 3 (S16). For example, the controller 11 controls the display unit 21 to display the display screen as shown in FIG. 11. Then, the controller 11 determines whether a request to log in to the multifunction peripheral 3 has been made by detecting whether the user has selected an enter key 22B on the display screen. If the touch panel 22 does not detect the selection of the enter key 22B (NO in S16), the controller 11 brings the information processing device 1 into a standby state without proceeding to S17.

If, on the other hand, the touch panel 22 detects that the enter key 22B has been selected by the user and accepted through the touch panel 22 (YES in S16), the controller 11 determines that it has been instructed to log in to the multifunction peripheral 3.

Then, the authentication information transmitting section 15 controls the communication unit 24 to transmit identification information stored in the HDD 25 to the multifunction peripheral 3 through the network N (S17).

As shown in FIG. 14, the controller 51 of the multifunction peripheral 3 determines whether the communication unit 83 has received the identification information from the information processing device 1 (S71). If the controller 51 determines that the communication unit 83 has not received the identification information from the information processing device 1 (NO in S71), the controller 51 brings the multifunction peripheral 3 into a standby state without proceeding to S72.

If, on the other hand, the controller 51 determines that the communication unit 83 has received the identification information from the information processing device 1 (YES in S71), the controller 51 determines that it needs to determine whether the identification information has been received within the validated period of the access token. Then, the second determination section 57 determines whether the elapsed time counted by the first timer 85 is within the first predesignated time (S72). If the second determination section 57 determines that the elapsed time counted by the first timer 85 is within the first predesignated time (YES in S72), the controller 51 determines that the elapsed time is within the validated period of the access token, and performs the process again from S65. In this case, if the identification information that was determined to have been received in S71 matches the identification information stored in the storage unit 84 (YES in S65), the controller 51 authorizes the information processing device 1 to use the multifunction peripheral 3, and controls the print unit 72 to perform print processing on the print job. According to this embodiment, the multifunction peripheral 3 can perform print processing only with the identification information from the information processing device 1 if it is within the validated period of the access token. Thus, this embodiment allows the user of the information processing device 1 to readily use the multifunction peripheral 3 to perform print processing.

If, on the other hand, the second determination section 57 determines that the elapsed time counted by the first timer 85 is not within the first predesignated time (NO in S72), the controller 51 determines the access token is invalid. Then, the authentication information requesting section 54 transmits a request for transmission of identification information and a refresh token from the communication unit 83 to the information processing device 1 through the network N (S73).

As shown in FIG. 13, the controller 11 of the information processing device 1 determines whether the communication unit 24 has received the request for transmission of the identification information and refresh token from the multifunction peripheral 3 (S18). If the controller 11 determines that the communication unit 24 has not received the request for transmission of the identification information and refresh token from the multifunction peripheral 3 (NO in S18), the controller 11 performs the process again from S8.

If, on the other hand, the controller 11 determines that the communication unit 24 has received the request for transmission of the identification information and refresh token from the multifunction peripheral 3 (YES in S18), the authentication information transmitting section 15 transmits the identification information and refresh token stored in the HDD 25 from the communication unit 24 to the multifunction peripheral 3 through the network N (S19).

As shown in FIG. 14, the controller 51 of the multifunction peripheral 3 determines whether the communication unit 83 has received the identification information and refresh token from the information processing device 1 (S74). If the controller 51 determines that the communication unit 83 has not received the identification information and refresh token from the information processing device 1 (NO in S74), the controller 51 determines whether a predetermined time has elapsed since the request for transmission of the identification information and refresh token was transmitted to the information processing device 1 in S73

(S80). If the controller 51 determines that the predetermined time has not elapsed (NO in S80), the controller 51 brings the multifunction peripheral 3 into a standby state. If, on the other hand, the controller 51 determines that the predetermined time has elapsed (YES in S80), the controller 51 determines not to authorize the information processing device 1 to use the multifunction peripheral 3, and proceeds to S81, which will be described later.

If, on the other hand, the controller 51 determines that the communication unit 83 has received the identification information and refresh token from the information processing device 1 (YES in S74), the controller 51 determines that the information processing device 1 has issued a request again for the use of the multifunction peripheral 3. Then, the first determination section 56 determines whether the refresh token received by the communication unit 83 matches the refresh token stored in the storage unit 84 (S75). If the first determination section 56 determines that the refresh token received by the communication unit 83 does not match the refresh token stored in the storage unit 84 (NO in S75), the controller 51 determines not to authorize the information processing device 1 to use the multifunction peripheral 3, and proceeds to S81.

If, on the other hand, the first determination section 56 determines that the refresh token received by the communication unit 83 matches the refresh token stored in the storage unit 84 (YES in S75), the first determination section 56 further determines whether the identification information received by the communication unit 83 matches the identification information stored in the storage unit 84 (S76). If the first determination section 56 determines that the identification information received by the communication unit 83 does not match the identification information stored in the storage unit 84 (NO in S76), the controller 51 determines not to authorize the information processing device 1 to use the multifunction peripheral 3, and proceeds to S81.

If, on the other hand, the first determination section 56 determines that the identification information received by the communication unit 83 matches the identification information stored in the storage unit 84 (YES in S76), the controller 51 determines to authorize the information processing device 1 to use the multifunction peripheral 3. Then, the controller 51 transmits authorization information from the communication unit 83 to the information processing device 1 through the network N (S77).

If the controller 51 determines not to authorize the information processing device 1 to use the multifunction peripheral 3 in S75, S76, or S80, the controller 51 transmits non-authorization information from the communication unit 83 to the information processing device 1 through the network N (S81).

As shown in FIG. 13, the controller 11 of the information processing device 1 determines whether the communication unit 24 has received the authorization information from the multifunction peripheral 3 (S20).

If the controller 11 determines that the communication unit 24 has received the authorization information from the multifunction peripheral 3 (YES in S20), the controller 11 controls the display unit 21 to display a display screen (not shown) to indicate that the use of the multifunction peripheral 3 is authorized (S21). The controller 11 further determines whether the operation accepting section 12 has accepted a request made by the user to use the multifunction peripheral 3 to perform print processing (S22). To this end, for example, the controller 11 controls the display unit 21 to display the display screen as shown in FIG. 12. Then, the controller 11 determines whether a request to perform print processing on a print job has been made by detecting whether the user has selected any of a print job 1, a print job 2, a print job 3, and a print job 4, and also selected a select key 22C on the display screen shown in FIG. 12. If the touch panel 22 does not detect the selection of any of the print jobs (NO in S22), the controller 11 brings the information processing device 1 into a standby state without proceeding to S23.

If, on the other hand, the touch panel 22 detects that the print job 2, for example, has been selected by the user and accepted through the touch panel 22, and also the select key 22C has been selected by the user and accepted through the touch panel 22 (YES in S22), the controller 11 determines that it has been instructed to perform print processing on the print job 2. Then, the controller 11 acquires the print job 2 from the HDD 25, and controls the communication unit 24 to transmit the print job 2 to the multifunction peripheral 3 through the network N (S23). Subsequently, the controller 11 transmits logout request information from the communication unit 24 to the multifunction peripheral 3 through the network N to log out from the multifunction peripheral 3 (S24).

If the controller 11 determines that the communication unit 24 has received the non-authorization information from the multifunction peripheral 3 (NO in S20), the controller 11 controls the display unit 21 to display a display screen (not shown) to indicate that the use of the multifunction peripheral 3 is authorized (S25), and terminates the process.

As shown in FIG. 14, the controller 51 of the multifunction peripheral 3 determines whether the communication unit 83 has received a print job from the information processing device 1 (S78). If the controller 51 determines that the communication unit 83 has not received the print job from the information processing device 1 (NO in S78), the controller 51 brings the multifunction peripheral 3 into a standby state without proceeding to S79.

If, on the other hand, the controller 51 determines that the communication unit 83 has received the print job from the information processing device 1 (YES in S78), the controller 51 controls the printing unit 72 to perform print processing on the print job (S79). As described above, in this embodiment, the information processing device 1 is authorized to use the multifunction peripheral 3 by using the refresh token even after the access token is expired, and can perform print processing using the multifunction peripheral 3. Subsequently, if the communication unit 83 receives logout request information from the information processing device 1, the controller 51 controls the communication unit 83 to log out the information processing device 1 so that the user of the information processing device 1 cannot use the multifunction peripheral 3 (not shown).

Figure 15:
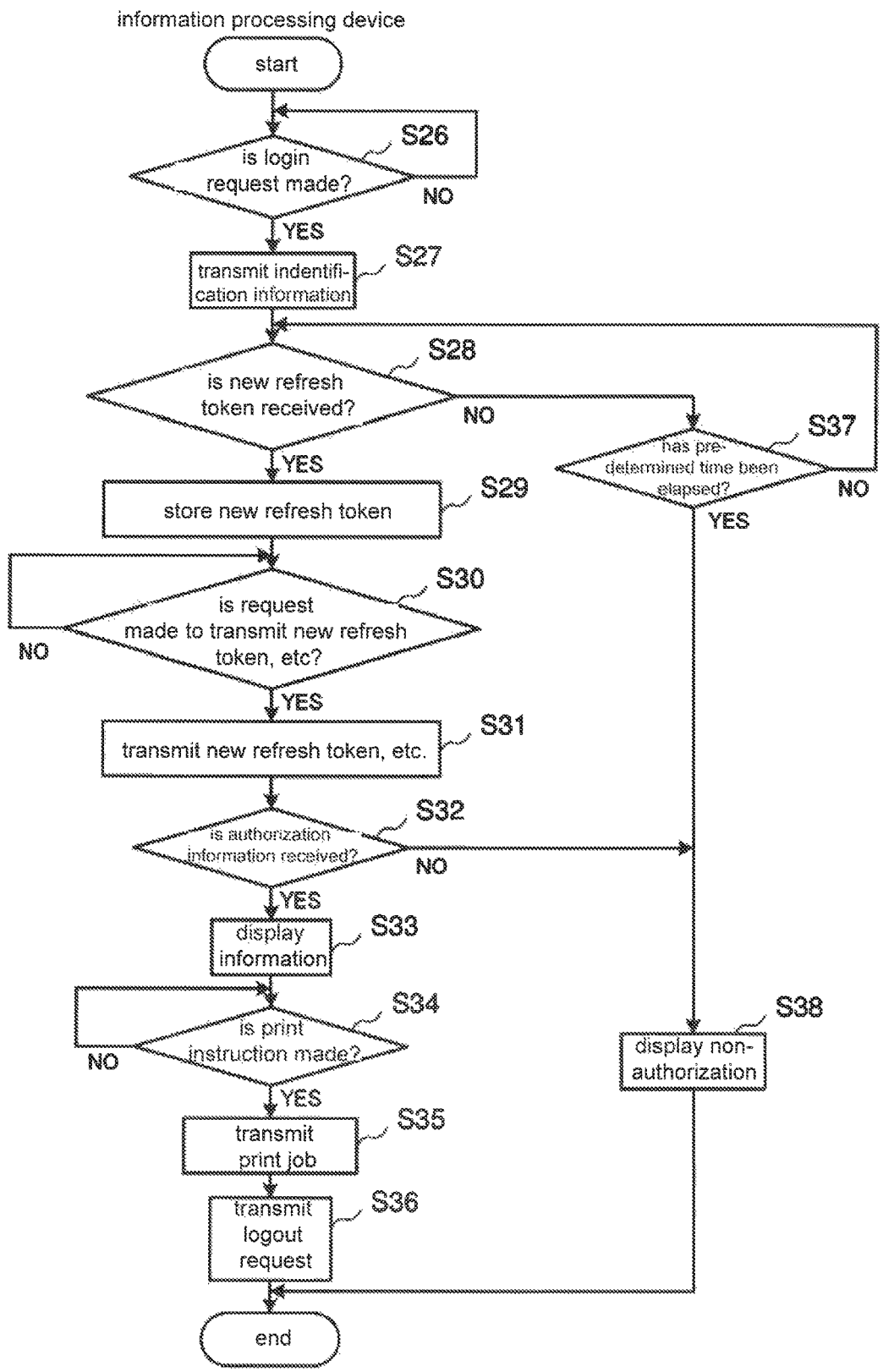
FIG. 15 is a flowchart of yet another process performed by the information processing device.
Figure 16:
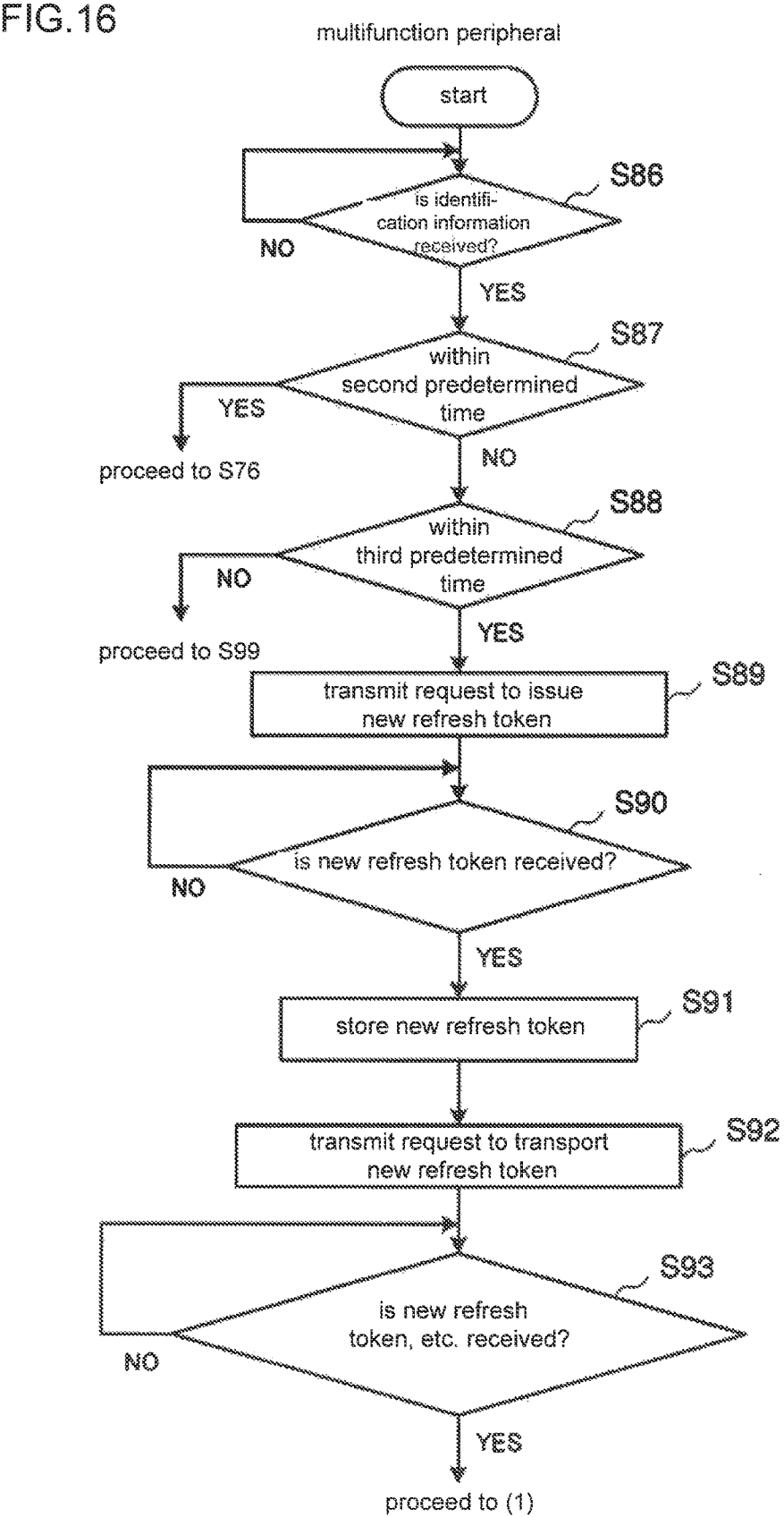
FIG. 16 is a flowchart of yet another process performed by the multifunction peripheral.
Figure 17:
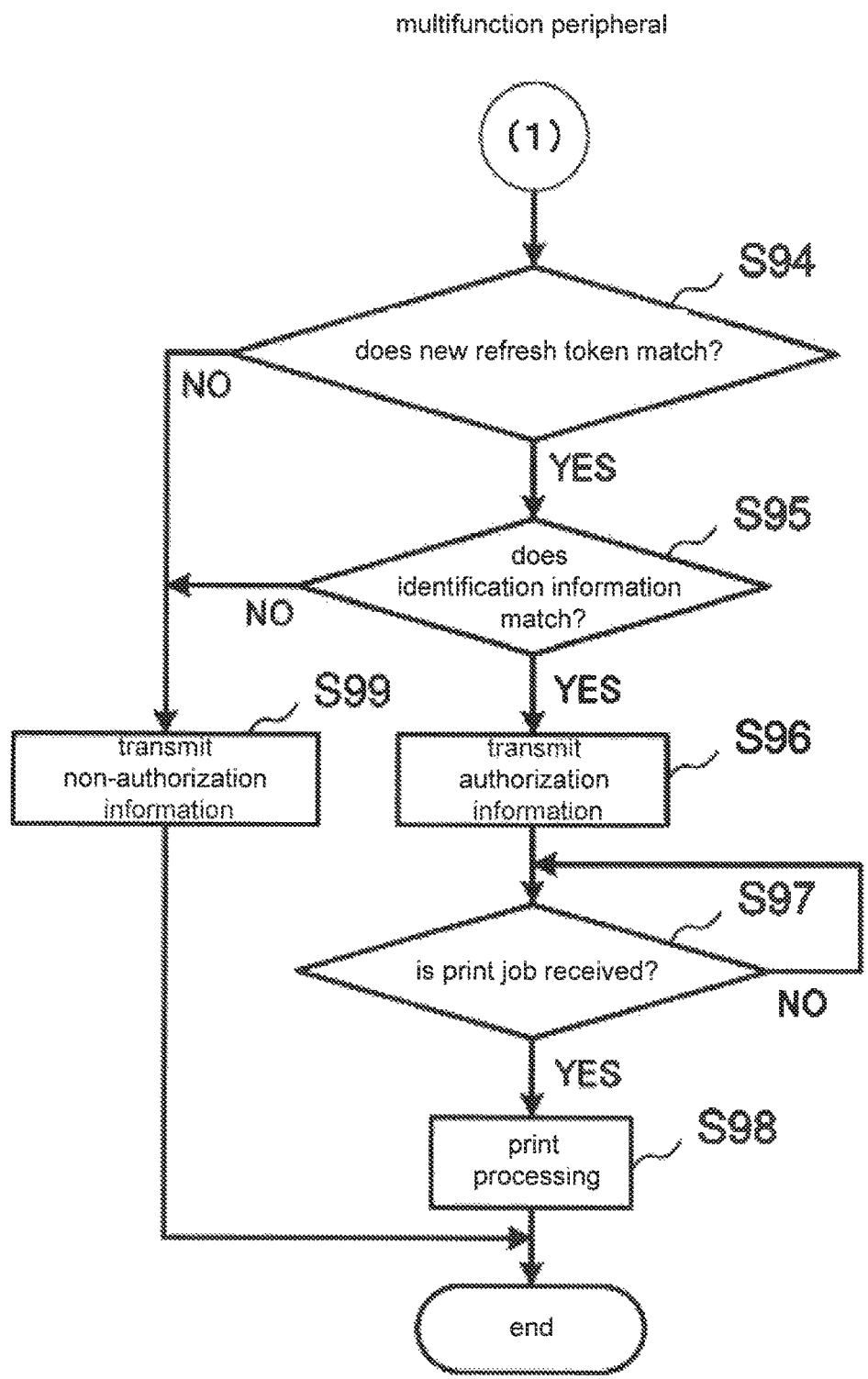
FIG. 17 is a flowchart of process steps subsequent to (1) shown in FIG. 16.
Figure 18:
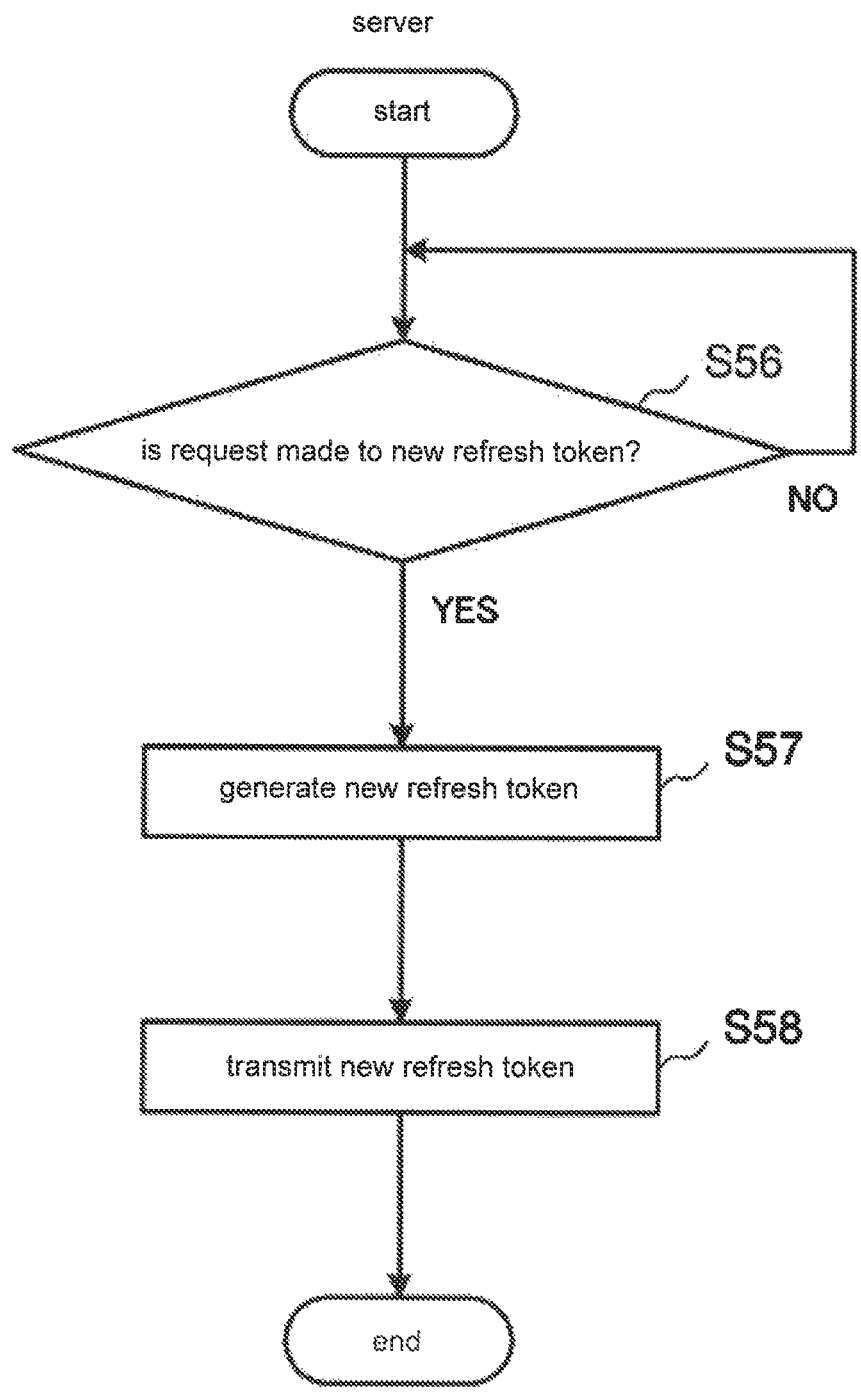
FIG. 18 is a flowchart of another process performed by the server.

Next, with reference to FIGS. 5 and 15 to 18, a detailed description will be given about a process using identification information and a login process between the information processing device 1, server 2, and multifunction peripheral 3 using a new refresh token after the information processing device 1 has logged in to the multifunction peripheral 3 using a refresh token. FIG. 15 is a flowchart of yet another process performed by the information processing device. FIG. 16 is a flowchart of yet another process performed by the multifunction peripheral. FIG. 17 is a flowchart of a process after (1) shown in FIG. 16. FIG. 18 is a flowchart of another process performed by the server.

As shown in FIG. 15, the controller 11 of the information processing device 1 determines whether the operation accepting section 12 has accepted a request made by the user to log in to the multifunction peripheral 3 (S26). To this end, for example, the controller 11 controls the display unit 21 to display the display screen as shown in FIG. 11. Then, the controller 11 determines whether a request to log in to the multifunction peripheral 3 has been made by detecting whether the user has selected an enter key 22B on the display screen. If the touch panel 22 does not detect the selection of the enter key 22B (NO in S26), the controller 11 brings the information processing device 1 into a standby state without proceeding to S27.

If, on the other hand, the touch panel 22 detects that the enter key 22B has been selected by the user and accepted through the touch panel 22 (YES in S26), the controller 11 determines that the information processing device 1 has been instructed to log in to the multifunction peripheral 3.

Then, the authentication information transmitting section 15 transmits identification information stored in the HDD 25 from the communication unit 24 to the multifunction peripheral 3 through the network N (S27).

As shown in FIG. 16, the controller 51 of the multifunction peripheral 3 determines whether the communication unit 83 has received the identification information from the information processing device 1 (S86). If the controller 51 determines that the communication unit 83 has not received the identification information from the information processing device 1 (NO in S86), the controller 51 brings the multifunction peripheral 3 into a standby state without proceeding to S87.

If, on the other hand, the controller 51 determines that the communication unit 83 has received the identification information from the information processing device 1 (YES in S86), the controller 51 determines that it needs to determine whether the identification information has been received within the validated period of the refresh token. The third determination section 58 determines whether the elapsed time counted by the second timer 86 is within the second predesignated time (S87). If the third determination section 58 determines that the elapsed time counted by the second timer 86 is within the second predesignated time (YES in S87), the controller 51 determines that the elapsed time is within the validated period of the refresh token, and performs the process again from S76. In this case, if the identification information that was determined to be received in S86 matches the identification information stored in the storage unit 84 (YES in S76), the controller 51 authorizes the information processing device 1 to use the multifunction peripheral 3, and controls the printing unit 72 to perform print processing on the print job transmitted from the information processing device 1. According to this embodiment, the multifunction peripheral 3 can perform print processing only with the identification information from the information processing device 1 if it is within the validated period of the refresh token. Thus, this embodiment allows the user of the information processing device 1 to readily use the multifunction peripheral 3 to perform print processing.

If, on the other hand, the third determination section 58 determines that the elapsed time counted by the second timer 86 is not within the second predesignated time (NO in S87), the controller 51 determines that the refresh token is invalid, and further determines that it needs to determine whether a request for a new refresh token can be made to the server 2. Then, the fourth determination section 59 determines whether the elapsed time counted by the first timer 85 is within the third predesignated time (S88). If the fourth determination section 59 determines that the elapsed time counted by the first timer 85 is not within the third predesignated time (NO in S88), the controller 51 determines that it is impossible to make a request to the server for a new refresh token, also determines not to authorize the information processing device 1 to use the multifunction peripheral 3, and proceeds to S99, which will be described later.

If the fourth determination section 59 determines that the elapsed time counted by the first timer 85 is within the third predesignated time (YES in S88), the controller 51 determines that it is possible to make a request to the server 2 for a new refresh token. Then, the authentication information issue requesting section 55 transmits a request for issue of a new refresh token from the communication unit 83 to the server 2 through the network N (S89).

As shown in FIG. 18, the controller 31 of the server 2 determines whether the communication unit 40 has received the request for issue of a new refresh token from the multifunction peripheral 3 (S56). If the controller 31 determines that the communication unit 40 has not received the request for issue of a new refresh token from the multifunction peripheral 3 (NO in S56), the controller 31 brings the server 2 into a standby state without proceeding to S57.

If, on the other hand, the controller 31 determines that the communication unit 40 has received the request for issue of a new refresh token from the multifunction peripheral 3 (YES in S56), the controller 31 determines that it has been requested to generate a new refresh token. Then, the token generator 33 generates a new refresh token (S57). Subsequently, the authentication information instructing section 34 transmits the new refresh token generated by the token generator 33 from the communication unit 40 to the information processing device 1 and multifunction peripheral 3 through the network N (S58).

As shown in FIG. 15, the controller 11 of the information processing device 1 determines whether the communication unit 24 has received the new refresh token from the server 2 (S28). If the controller 11 determines that the communication unit 24 has received the new refresh token from the server 2 (YES in S28), the authentication information receiving section 14 receives the new refresh token from the communication unit 24, and stores the received new refresh token in the HDD 25 (S29).

As shown in FIG. 16, the controller 51 of the multifunction peripheral 3 determines whether the communication unit 83 has received the new refresh token from the server 2 (S90). If the controller 51 determines that the communication unit 83 has not received the new refresh token from the server 2 (NO in S90), the controller 51 brings the multifunction peripheral 3 into a standby state without proceeding to S91.

If, on the other hand, the controller 51 determines that the communication unit 83 has received the new refresh token from the server 2 (YES in S90), the controller 51 determines that the information processing device 1 has been authorized by the server to use the multifunction peripheral 3 without transmitting fingerprint information again to the server 2. Then, the authentication information acquiring section 53 acquires the new refresh token received by the communication unit 83, and stores the acquired new refresh token in the storage unit 84 (S91). Subsequently, the authentication information requesting section 54 transmits a request to the image processing device 1 to transmit identification information and the new refresh token (S92).

As shown in FIG. 15, the controller 11 of the information processing device 1 determines whether the communication unit 24 has received the request for transmission of the identification information and new refresh token from the multifunction peripheral 3 (S30). If the controller 11 determines that the communication unit 24 has not received the request for transmission of the identification information and new refresh token from the multifunction peripheral 3 (NO in S30), the controller 11 brings the information processing device 1 into a standby state without proceeding to S31.

If, on the other hand, the controller 11 determines that the communication unit 24 has received the request for transmission of the identification information and new refresh token from the multifunction peripheral 3 (YES in S30), the authentication information transmitting section 15 transmits the identification information and new refresh token stored in the HDD 25 from the communication unit 24 to the multifunction peripheral 3 through the network N (S31).

As shown in FIG. 16, the controller 51 of the multifunction peripheral 3 determines whether the communication unit 83 has received the identification information and new refresh token from the information processing device 1 (S93). If the controller 51 determines that the communication unit 83 has not received the identification information and new refresh token from the information processing device 1 (NO in S93), the controller 51 brings the multifunction peripheral 3 into a standby state without proceeding to S94.

If, on the other hand, the controller 51 determines that the communication unit 83 has received the identification information and new refresh token from the information processing device 1 (YES in S93), the controller 51 determines that the information processing device 1 has issued a request again to use the multifunction peripheral 3. Then, the first determination section 56 determines whether the new refresh token received by the communication unit 83 matches the new refresh token stored in the storage unit 84 (S94). Subsequently, if the first determination section 56 determines that the new refresh token received by the communication unit 83 does not match the new refresh token stored in the storage unit 84 (NO in S94), the controller 51 determines not to authorize the information processing device 1 to use the multifunction peripheral 3, and proceeds to S99.

If, on the other hand, the first determination section 56 determines that the new refresh token received by the communication unit 83 matches the new refresh token stored in the storage unit 84 (YES in S94), the first determination section 56 further determines whether the identification information received by the communication unit 83 matches the identification information stored in the storage unit 84 (S95). If the first determination section 56 determines that the identification information received by the communication unit 83 does not match the identification information stored in the storage unit 84 (NO in S95), the controller 51 determines not to authorize the information processing device 1 to use the multifunction peripheral 3, and proceeds to S99.

If, on the other hand, the first determination section 56 determines that the identification information received by the communication unit 83 matches the identification information stored in the storage unit 84 (YES in S95), the controller 51 determines to authorize the information processing device 1 to use the multifunction peripheral 3. Then, the controller 51 transmits authorization information from the communication unit 83 to the information processing device 1 through the network N (S96).

If the controller 51 determines not to authorize the information processing device 1 to use the multifunction peripheral 3 in S88, S94, or S95, the controller 51 transmits non-authorization information from the communication unit 83 to the information processing device 1 through the network N (S99).

As shown in FIG. 15, the controller 11 of the information processing device 1 determines whether the communication unit 24 has received the authorization information from the multifunction peripheral 3 (S32).

If the controller 11 determines that the communication unit 24 has received the authorization information from the multifunction peripheral 3 (YES in S32), the controller 11 controls the display unit 21 to display a display screen (not shown) to indicate that the use of the multifunction peripheral 3 is authorized (S33). The controller 11 further determines whether the operation accepting section 12 has accepted a request made by a user to perform print processing using the multifunction peripheral 3 (S34). To this end, for example, the controller 11 controls the display unit 21 to display the display screen as shown in FIG. 12. Then, the controller 11 determines whether a request to perform print processing on a print job has been made by detecting whether the user has selected any of a print job 1, a print job 2, a print job 3, and a print job 4, and also selected the selection key 22C on the display screen shown in FIG. 12. If the touch panel 22 does not detect the selection of any of the print jobs (NO in S34), the controller 11 brings the information processing device 1 into a standby state without proceeding to S35.

If, on the other hand, the touch panel 22 detects that the print job 3, for example, has been selected by the user and accepted through the touch panel 22, and also the select key 22C has been selected by the user and accepted through the touch panel 22 (YES in S34), the controller 11 determines that it has been instructed to perform print processing on the print job 3. Then, the controller 11 acquires the print job 3 from the HDD 25, and transmits the print job 3 from the communication unit 24 to the multifunction peripheral 3 through the network N (S35). Subsequently, the controller 11 transmits logout request information from the communication unit 24 to the multifunction peripheral 3 through the network N to log out from the multifunction peripheral 3 (S36).

If the controller 11 determines that the communication unit 24 has not received the new refresh token from the server 2 (NO in S28), the controller 11 determines whether a predetermined time has elapsed since the identification information was transmitted in S27 (S37). If the controller 11 determines that the predetermined time has not elapsed (NO in S37), the controller 11 proceeds to S28.

If, on the other hand, the controller 11 determines that the predetermined time has elapsed (YES in S37), the controller 11 determines that the use of the multifunction peripheral 3 is not authorized, controls the display unit 21 to display a display screen (not shown) to indicate that the use of the multifunction peripheral 3 is not authorized (S38), and terminates the process. If the controller 11 determines that the communication unit 24 has received non-authorization information from the multifunction peripheral 3 (NO in S32), the controller 11 controls the display unit 21 to display a display screen (not shown) to indicate that the use of the multifunction peripheral 3 is not authorized (S38), and terminates the process.

As shown in FIG. 17, the controller 51 of the multifunction peripheral 3 determines whether the communication unit 83 has received a print job from the information processing device 1 (S97). If the controller 51 determines that the communication unit 83 has not received a print job from the information processing device 1 (NO in S97), the controller 51 brings the multifunction peripheral 3 into a standby state without proceeding to S98.

If, on the other hand, the controller 51 determines that the communication unit 83 has received a print job from the information processing device 1 (YES in S97), the controller 51 controls the printing unit 72 to perform print processing on the print job (S98). As described above, in this embodiment, the information processing device 1 is authorized to use the multifunction peripheral 3 by using the new refresh token even after the refresh token is expired, and can perform print processing using the multifunction peripheral 3. Subsequently, if the communication unit 83 receives the logout request information from the information processing device 1, the controller 51 controls the communication unit 83 to log out the information processing device 1 so that the user of the information processing device 1 cannot use the multifunction peripheral 3 (not shown).

Figure 19:
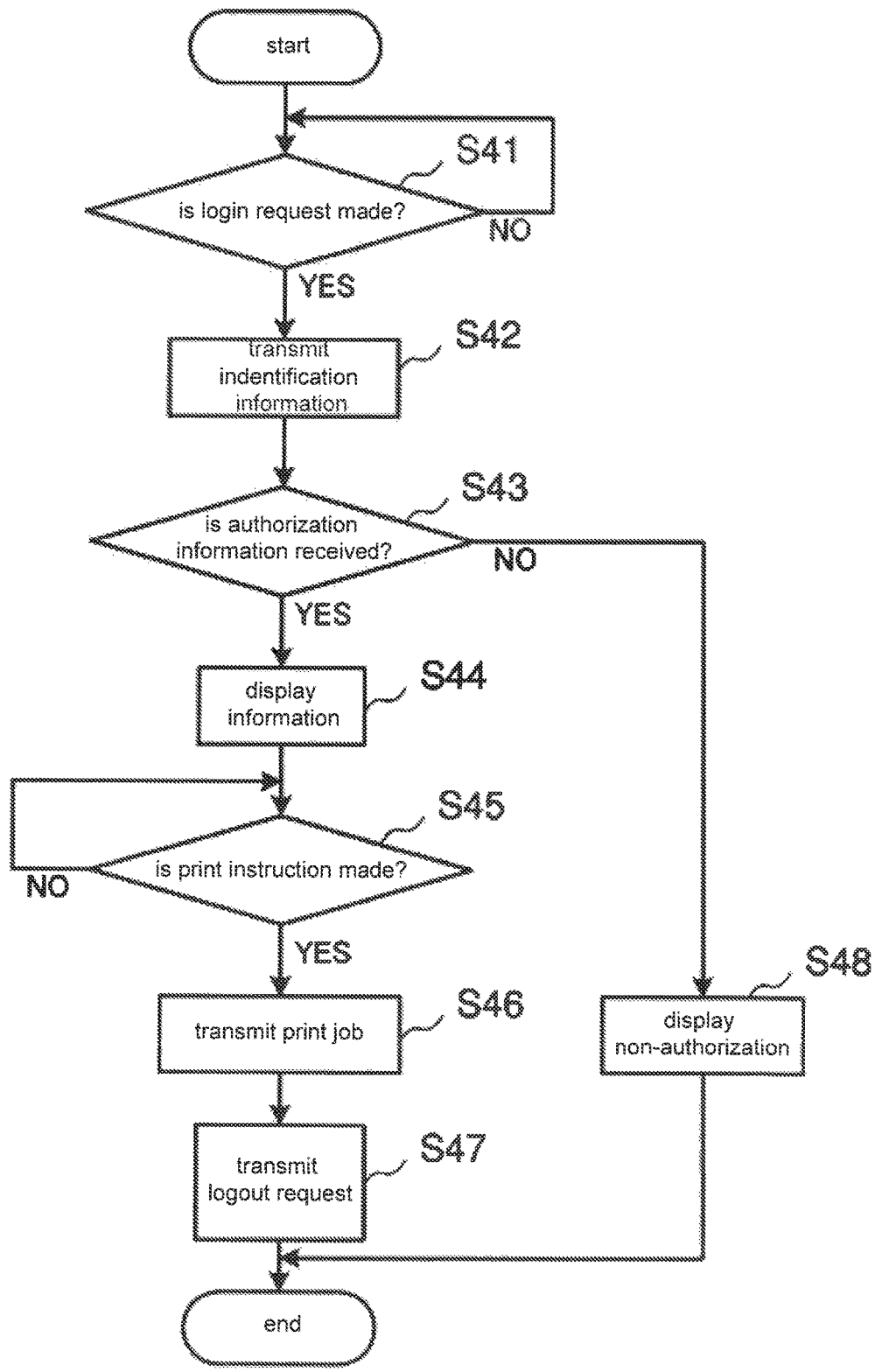
FIG. 19 is a flowchart of yet another process performed by the information processing device.
Figure 20:
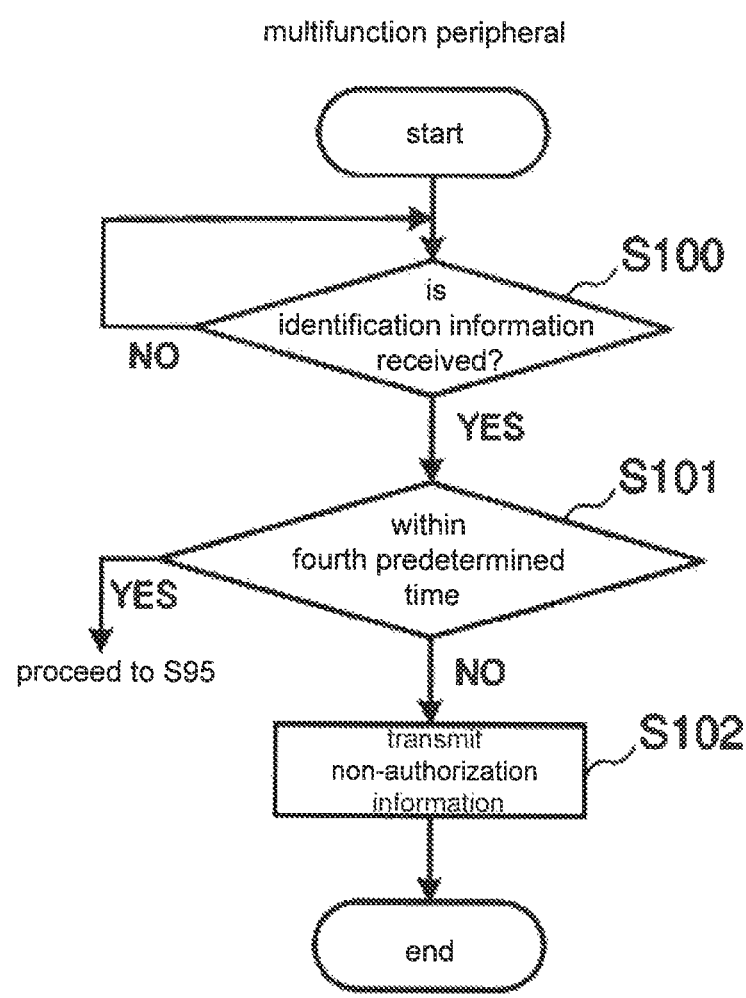
FIG. 20 is a flowchart of yet another process performed by the multifunction peripheral.

With reference to FIGS. 5, 19, and 20, a detailed description will be made about a process using identification information after the information processing device 1 has logged in to the multifunction peripheral 3 with a new refresh token. FIG. 19 is a flowchart of yet another process performed by the information processing device. FIG. 20 is a flowchart of yet another process performed by the multifunction peripheral.

As shown in FIG. 19, the controller 11 of the information processing device 1 determines whether the operation accepting section 12 has accepted a request made by a user to log in to the multifunction peripheral 3 (S41). To this end, for example, the controller 11 controls the display unit 21 to display the display screen as shown in FIG. 11. Then, the controller 11 determines whether a request to log in to the multifunction peripheral 3 has been made by detecting whether the user has selected an enter key 22B on the display screen. If the touch panel 22 does not detect the selection of the enter key 22B (NO in S41), the controller 11 brings the information processing device 1 into a standby state without proceeding to S42.

If, on the other hand, the touch panel 22 detects that the enter key 22B has been selected by the user and accepted through touch panel 22 (YES in S41), the controller 11 determines that it has been instructed to log in to the multifunction peripheral 3.

Then, the authentication information transmitting section 15 transmits the identification information stored in the HDD 25 from the communication unit 24 to the multifunction peripheral 3 through the network N (S42).

As shown in FIG. 20, the controller 51 of the multifunction peripheral 3 determines whether the communication unit 83 has received the identification information from the information processing device 1 (S100). If the controller 51 determines that the communication unit 83 has not received the identification information from the information processing device 1 (NO in S100), the controller 51 brings the multifunction peripheral 3 into a standby state without proceeding to S101.

If, on the other hand, the controller 51 determines that the communication unit 83 has received the identification information from the information processing device 1 (YES in S100), the controller 51 determines that it needs to determine whether the identification information was received within the validated period of the new refresh token. Then, the fifth determination section 60 determines whether the elapsed time counted by the third timer 87 is within the fourth predesignated time (S101). If the fifth determination section 60 determines that the elapsed time counted by the third timer 87 is within the fourth predesignated time (YES in S101), the controller 51 determines that the elapsed time is within the validated period of the new refresh token, and performs the process again from S95. In this case, if the identification information that was determined to be received in S100 matches the identification information stored in the storage unit 84 (YES in S95), the controller 51 determines to authorize the information processing device 1 to use the multifunction peripheral 3, and controls the printing unit 72 to perform print processing on the print job from the information processing device 1. According to this embodiment, the multifunction peripheral 3 can perform print processing only with the identification information from the information processing device 1 if it is within the validated period of the new refresh token. Thus, this embodiment allows the user of the information processing device 1 to readily use the multifunction peripheral 3 to perform print processing.

If, on the other hand, the fifth determination section 60 determines that the elapsed time counted by the third timer 87 is not within the fourth predesignated time (NO in S101), the controller 51 determines that the new refresh token is invalid, and further determines not to authorize the information processing device 1 to use the multifunction peripheral 3. Then, the controller 51 transmits non-authorization information from the communication unit 83 to the information processing device 1 through the network N (S102).

As shown in FIG. 19, the controller 11 of the information processing device 1 determines whether the communication unit 24 has received the authorization information from the multifunction peripheral 3 (S43).

If the controller 11 determines that the communication unit 24 has received the authorization information from the multifunction peripheral 3 (YES in S43), the controller 11 controls the display unit 21 to display a display screen (not shown) to indicate that the use of the multifunction peripheral 3 is authorized (S44). The controller 11 further determines whether the operation accepting section 12 has accepted a request made by the user to perform print processing using the multifunction peripheral 3 (S45). To this end, for example, the controller 11 controls the display unit 21 to display the display screen as shown in FIG. 12. Then, the controller 11 determines whether a request has been made to perform print processing on a print job by detecting whether the user has selected any of a print job 1, a print job 2, a print job 3, and a print job 4, and also whether the user has selected the selection key 22C on the screen shown in FIG. 12. If the touch panel 22 does not detect the selection of any of the print jobs (NO in S45), the controller 11 brings the information processing device 1 into a standby state without proceeding to S46.

If, on the other hand, the touch panel 22 detects that the print job 4, for example, has been selected by the user and accepted through the touch panel 22, and also the select key 22C has been selected by the user and accepted through the touch panel 22 (YES in S45), the controller 11 determines that it has been instructed to perform print processing on the print job 4. Then, the controller 11 acquires the print job 4 from the HDD 25, and transmits the print job 4 from the communication unit 24 to the multifunction peripheral 3 through the network N (S46). Subsequently, the controller 11 transmits logout request information from the communication unit 24 to the multifunction peripheral 3 through the network N to log out from the multifunction peripheral 3 (S47).

If the controller 11 determines that the communication unit 24 has received the non-authorization information from the multifunction peripheral 3 (NO in S43), the controller 11 controls the display unit 21 to display a display screen (not shown) to indicate that the use of the multifunction peripheral 3 is not authorized (S48), and terminates the process.

As described in the embodiment, the server 2 stores in advance fingerprint information (biological information) of users of the information processing devices 1 that are authorized to use the multifunction peripheral 3, and when the stored fingerprint information matches a user's fingerprint information transmitted from an information processing device 1, the serve 2 transmits the user's identification information and an access token to the information processing device 1 and multifunction peripheral 3. The information processing device 1 transmits stored the identification information and access token to the multifunction peripheral 3 when the first request to log in to the multifunction peripheral 3 is accepted. When the identification information from the information processing device 1 matches stored the identification information, and also when the access token from the information processing device 1 matches stored the access token, the multifunction peripheral 3 authorizes the user of the information processing device 1 that transmitted the identification information and access token to use the multifunction peripheral 3. The image forming system configured as described above is different from conventional examples in that it can perform user authentication using biological information with a simple configuration, and it can grant authorization to a plurality of information processing devices 1 to use a multifunction peripheral 3 while retaining security.

Although the server 2 in the above description uses fingerprint information as predetermined biological information of users, this disclosure is not limited thereto, and the biological information used herein can be users' facial information, iris information, voiceprint information, fingervein information, and so on.

In addition, the server 2 in the above description generates an access token and refresh token, and transmits generated the access token and refresh token together with a user's identification information to both the information processing device 1 and multifunction peripheral 3; however, the server 2 in this disclosure is not limited thereto, but at least generates an access token, and transmits the generated access token together with a user's identification information to both the information processing device 1 and multifunction peripheral 3. In this case, the first timer 85 starts counting time elapsed from when the communication unit 83 receives identification information and an access token from the information processing device 1 through the network N.

Note that the configuration and processes according to the embodiment with reference to FIGS. 1 to 20 are merely examples of the embodiment, and are not meant to limit the present disclosure.

What is claimed is:
1. An image forming system comprising an information processing device, a server, and a multifunction peripheral that are connected on a network, wherein
the information processing device includes:
a first storage unit;
an operation accepting unit that accepts an operational instruction from a user who is an operator of the information processing device;
a first communication unit that performs data communication with the server and the multifunction peripheral through the network;
a biological information acquiring section that acquires user-predetermined biological information from the user;
a biological information transmission instructing section that, when the operation accepting unit accepts a request to start operating the multifunction peripheral, transmits the biological information, which is acquired by the biological information acquiring section, from the first communication unit to the server through the network;
an authentication information receiving section that, when the first communication unit receives from the server through the network user's identification information for identifying the user and an access token to be used to log in to the multifunction peripheral to authorize the user to use the multifunction peripheral, stores the received identification information and access token in the first storage unit; and
an authentication information transmitting section that, when the operation accepting unit accepts the first request to log in to the multifunction peripheral after the authentication information receiving section have received the identification information and the access token, transmits the identification information and the access token stored in the first storage unit from the first communication unit to the multifunction peripheral through the network,
the server includes:
a second storage unit that stores in advance the biological information of individual users who are authorized to use the multifunction peripheral, and the identification information of the users associated with the biological information;
a second communication unit that performs data communication with the information processing device and the multifunction peripheral through the network;
a determination section that, when the second communication unit receives the biological information from the information processing device through the network, determines whether the biological information received by the second communication unit matches the biological information stored in the second storage unit;
a token generator that, when the determination section determines that the biological information received by the second communication unit matches the biological information stored in the second storage unit, generates the access token; and
an authentication information instructing section that, when the token generator generates the access token, acquires the identification information of the user whose biological information is determined by the determination section to match the biological information stored in the second storage unit, from the second storage unit, and transmits the acquired identification information and the access token generated by the token generator from the second communication unit to the information processing device and the multifunction peripheral through the network, and
the multifunction peripheral includes:
a third storage unit;
a third communication unit that performs data communication with the information processing device and the server through the network;
an authentication information acquiring section that, when the third communication unit receives the identification information and the access token from the server through the network, stores the received identification information and access token in the third storage unit;

a first determination section that, when the third communication unit receives the identification information and the access token from the information processing device through the network, determines whether the identification information received by the third communication unit matches the identification information stored in the third storage unit, and also determines whether the access token received by the third communication unit matches the access token stored in the third storage unit; and a controller that, when the first determination section determines that the identification information received by the third communication unit matches the identification information stored in the third storage unit and that the access token received by the third communication unit matches the access token stored in the third storage unit, authorizes the user to use the multifunction peripheral.

2. The image forming system according to claim 1, wherein the multifunction peripheral further includes a first timer that counts time elapsed from a point of time that the third communication unit has received the identification information and the access token from the information processing device through the network, and a second determination section that determines whether the elapsed time counted by the first timer is within a first predesignated time, when the operation accepting section accepts a login request after the user has logged out from the multifunction peripheral to make it unusable, the authentication information transmitting section of the information processing device transmits the identification information stored in the first storage unit from the first communication unit to the multifunction peripheral through the network, when the third communication unit of the multifunction peripheral receives the identification information from the information processing device through the network, the first determination section determines whether the identification information received by the third communication unit matches the identification information stored in the third storage unit, and the second determination section determines whether the elapsed time counted by the first timer is within the first predesignated time, and when the first determination section determines that the identification information received by the third communication unit matches the identification information stored in the third storage unit and the second determination section determines that the elapsed time counted by the first timer is within the first predesignated time, the controller of the multifunction peripheral authorizes the user to use the multifunction peripheral.

3. The image forming system according to claim 1, wherein the token generator of the server generates, in addition to the access token, a refresh token to be used when the user logs in to the multifunction peripheral, when the token generator generates the access token and the refresh token, the authentication information instructing section transmits the identification information acquired from the second storage unit and the access token and the refresh token generated by the token generator from the second communication unit to the information processing device and multifunction peripheral through the network, when the first communication unit receives the identification information, the access token, and the refresh token from the server through the network, the authentication information receiving section of the information processing device stores the received identification information, access token, and refresh token in the first storage unit, when the third communication unit receives the identification information, the access token, and the refresh token from the server through the network, the authentication information acquiring section of the multifunction peripheral stores the received identification information, access token, and refresh token in the third storage unit, the multifunction peripheral further includes an authentication information requesting section that, if the second determination section determines that the elapsed time counted by the first timer exceeds the first predesignated time when the third communication unit receives the identification information from the information processing device through the network, transmits a request for transmission of the identification information and the refresh token from the third communication unit to the information processing device through the network, when the authentication information requesting section transmits the request for transmission of the identification information and the refresh token, the authentication information transmitting section of the information processing device transmits the identification information and the refresh token stored in the first storage unit from the first communication unit to the multifunction peripheral through the network, when the third communication unit receives the identification information and the refresh token from the information processing device through the network, the first determination section of the multifunction peripheral determines whether the identification information received by the third communication unit matches the identification information stored in the third storage unit and also determines whether the refresh token received by the third communication unit matches the refresh token stored in the third storage unit; and when the first determination section determines that the identification information received by the third communication unit matches the identification information stored in the third storage unit and that the refresh token received by the third communication unit matches the refresh token stored in the third storage unit, the controller of the multifunction peripheral authorizes the user to use the multifunction peripheral.

4. The image forming system according to claim 3, wherein the multifunction peripheral further includes a second timer that counts time elapsed from a point of time that the third communication unit has received the identification information and the refresh token from the information processing device through the network, and a third determination section that determines whether the elapsed time counted by the second timer is within a second predesignated time, when the operation accepting section accepts a login request after the user has logged out subsequent to the authentication information requesting section transmitting the request for transmission of the identification information and the refresh token, the authentication information transmitting section of the information processing device transmits the identification information stored in the first storage unit from the first communication unit to the multifunction peripheral through the network, when the third communication unit of the multifunction peripheral receives the identification information from the information processing device through the network, the first determination section determines whether the identification information received by the third communication unit matches the identification information stored in the third storage unit, and the third determination section determines whether the elapsed time counted by the second timer is within the second predesignated time, and when the first determination section determines that the identification information received by the third communication unit matches the identification information stored in the third storage unit, and also when the third determination section determines that the elapsed time counted by the second timer is within the second predesignated time, the controller of the multifunction peripheral authorizes the user to use the multifunction peripheral.

5. The image forming system according to claim 4, wherein the multifunction peripheral further includes a fourth determination section that determines whether the elapsed time counted by the first timer is within a third predesignated time, and an authentication information issue requesting section that, when the third communication unit receives the identification information from the information processing device through the network under circumstances where the third determination section determines that the elapsed time counted by the second timer exceeds the second predesignated time and the fourth determination section determines that the elapsed time counted by the first timer is within the third predesignated time, transmits a request for issue of a new refresh token from the third communication unit to the server through the network, when the authentication information issue requesting section transmits the request for issue of the new refresh token, the token generator of the server generates a new refresh token, when the token generator generates the new refresh token, the authentication information instructing section of the server transmits the new refresh token generated by the token generator from the second communication unit to the information processing device and the multifunction peripheral through the network, when the first communication unit receives the new refresh token from the server through the network, the authentication information receiving section of the information processing device stores the received new refresh token in the first storage unit, when the third communication unit receives the new refresh token from the server through the network, the authentication information acquiring section of the multifunction peripheral stores the received new refresh token in the third storage unit, when the new refresh token is stored in the third storage unit, the authentication information requesting section of the multifunction peripheral transmits a request for transmission of the identification information and the new refresh token to the image processing device, when the authentication information requesting section transmits the request for transmission of the identification information and the new refresh token, the authentication information transmitting section of the information processing device transmits the identification information and the new refresh token stored in the first storage unit from the first communication unit to the multifunction peripheral through the network, when the third communication unit receives the identification information and the new refresh token from the information processing device through the network, the first determination section of the multifunction peripheral determines whether the identification information received by the third communication unit matches the identification information stored in the third storage unit, and also determines whether the new refresh token received by the third communication unit matches the new refresh token stored in the third storage unit, and when the first determination section determines that the identification information received by the third communication unit matches the identification information stored in the third storage unit and determines that the new refresh token received by the third communication unit matches the new refresh token stored in the third storage unit, the controller of the multifunction peripheral authorizes the user to use the multifunction peripheral.

6. The image forming system according to claim 5, wherein the multifunction peripheral further includes a third timer that counts time elapsed from a point of time that the third communication unit has received the identification information and the new refresh token from the information processing device through the network, and a fifth determination section that determines whether the elapsed time counted by the third timer is within a fourth predesignated time, when the operation accepting section accepts a login request after the user has logged out subsequent to the authentication information requesting section transmitting the request for transmission of the identification information and the new refresh token, the authentication information transmitting section of the information processing device transmits the identification information stored in the first storage unit from the first communication unit to the multifunction peripheral through the network, when the third communication unit of the multifunction peripheral receives the identification information from the information processing device through the network, the first determination section determines whether the identification information received by the third communication unit matches the identification information stored in the third storage unit, and the fifth determination section determines whether the elapsed time counted by the third timer is within the fourth predesignated time, and when the first determination section determines that the identification information received by the third communication unit matches the identification information stored in the third storage unit, and the fifth determination section determines that the elapsed time counted by the third timer is within the fourth predesignated time, the controller of the multifunction peripheral authorizes the user to use the multifunction peripheral.

* * * * *